US011021141B2

(12) United States Patent
Jeong et al.

(10) Patent No.: US 11,021,141 B2
(45) Date of Patent: Jun. 1, 2021

(54) ELECTRIC BRAKE SYSTEM

(71) Applicant: MANDO CORPORATION, Gyeonggi-do (KR)

(72) Inventors: Hyojin Jeong, Gyeonggi-do (KR); Eun-Seong Lim, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 26 days.

(21) Appl. No.: 16/425,869

(22) Filed: May 29, 2019

(65) Prior Publication Data

US 2019/0366997 A1 Dec. 5, 2019

(30) Foreign Application Priority Data

May 30, 2018 (KR) .................. 10-2018-0061582

(51) Int. Cl.
*B60T 13/74* (2006.01)
*B60T 13/62* (2006.01)
*B60T 13/16* (2006.01)
*B60T 7/04* (2006.01)
*B60T 8/32* (2006.01)
*B60T 8/40* (2006.01)

(52) U.S. Cl.
CPC .............. *B60T 13/62* (2013.01); *B60T 7/042* (2013.01); *B60T 8/326* (2013.01); *B60T 8/4081* (2013.01); *B60T 13/167* (2013.01); *B60T 2270/10* (2013.01); *B60T 2270/30* (2013.01); *B60T 2270/402* (2013.01); *B60T 2270/404* (2013.01); *B60T 2270/413* (2013.01); *B60T 2270/82* (2013.01)

(58) Field of Classification Search
CPC ........ B60T 7/042; B60T 7/171; B60T 13/146; B60T 13/662; B60T 13/686; B60T 13/745; B60T 17/221
USPC ............................... 303/10, 11, 113.1–114.1
See application file for complete search history.

(56) References Cited

U.S. PATENT DOCUMENTS

| 8,651,587 B2* | 2/2014 | Baechle ................ B60T 8/4872 303/10 |
| 2015/0021981 A1* | 1/2015 | Shimada ................. B60T 8/176 303/121 |
| 2017/0129469 A1* | 5/2017 | Besier ................... B60T 13/686 |
| 2017/0144642 A1* | 5/2017 | Kim ...................... B60T 13/146 |

(Continued)

FOREIGN PATENT DOCUMENTS

KR 10-2012-0079093 7/2012

*Primary Examiner* — Christopher P Schwartz
(74) *Attorney, Agent, or Firm* — Ladas & Parry, LLP

(57) ABSTRACT

An electronic brake system of the present disclosure is disclosed. The an electronic brake system may include a reservoir to store oil; a master cylinder having a master piston connected to a brake pedal and a master chamber discharging oil by a displacement of the master piston; a hydraulic pressure supply apparatus generating hydraulic pressure by an electrical signal output corresponding to a displacement of the brake pedal to supply to wheel cylinders of the respective wheels; a hydraulic control unit transmitting the hydraulic pressure discharged from the hydraulic pressure supply apparatus to the wheel cylinders of the respective wheels; and a redundancy control apparatus generating hydraulic pressure using a motor and a pump to transmit to at least one of the wheel cylinders.

20 Claims, 10 Drawing Sheets

(56) References Cited

U.S. PATENT DOCUMENTS

2017/0274884 A1\* 9/2017 Besier .................. B60T 13/686
2017/0361825 A1\* 12/2017 Drumm ................ B60T 13/745

\* cited by examiner

[FIG. 2]

ELECTRIC BRAKE SYSTEM

CROSS-REFERENCE TO RELATED APPLICATION(S)

This application is based on and claims priority under 35 U.S.C. § 119 to Korean Patent Application No. 10-2018-0061582, filed on May 30, 2018, in the Korean Intellectual Property Office, the disclosure of which is incorporated herein by reference in its entirety.

BACKGROUND

1. Technical Field

The present disclosure relates to an electronic brake system, and more particularly, to an electronic brake system that generates a braking force that generates a braking force in accordance with an electrical signal.

2. Description of the Related Art

In general, a vehicle is essentially equipped with a brake system for braking, and in recent years, various types of brake systems have been proposed to obtain a more powerful and stable braking force.

For example, the brake system includes an anti-lock brake system (ABS) for preventing slippage of the wheels during braking operation, a brake traction control system (BTCS) for preventing the drive wheels from slipping when the vehicle suddenly starts or suddenly accelerates, an electronic stability control system (ESC) for stably maintaining the running state of the vehicle by controlling the brake hydraulic pressure by combining the anti-lock brake system and the traction control system, and the like.

In the conventional brake system, when a driver depresses a brake pedal, a hydraulic pressure necessary for braking is supplied to a wheel cylinder using a mechanically connected vacuum booster. In recent years, however, an electronic brake system including a hydraulic pressure supply apparatus, which receives an electrical signal corresponding to the driver's braking will from a pedal displacement sensor that senses displacement of the brake pedal when the driver depresses the brake pedal and supplies the hydraulic pressure required for braking to the wheel cylinder, is widely used.

The brake system for vehicle disclosed in Patent Publication No. 10-2012-0079093 performs a fallback mode in which a braking is possible by a driver in the event of a system abnormality. In the fallback mode, braking utilizes the pressure of a master cylinder generated by the vehicle driver operating the brake pedal.

However, in the conventional brake system, the fallback mode relies on the driver's brake pedal operation, requiring a significant brake pedal force from the driver.

SUMMARY

It is an aspect of the present disclosure to provide an electronic brake system capable of more effectively performing emergency braking in the event of a system abnormality.

It is another aspect of the present disclosure to provide an electronic brake system that may more efficiently design a hydraulic circuit of the system.

Additional aspects of the present disclosure will be set forth in part in the description which follows and, in part, will be obvious from the description, or may be learned by practice of the disclosure.

In accordance with one aspect of the present disclosure, an electronic brake system may include a reservoir to store oil; a master cylinder having a master piston connected to a brake pedal and a master chamber for discharging oil by a displacement of the master piston; a hydraulic pressure supply apparatus generating hydraulic pressure by an electrical signal output corresponding to a displacement of the brake pedal to supply to wheel cylinders of the respective wheels; a hydraulic control unit having a first hydraulic circuit for controlling the hydraulic pressure transmitted to the two wheel cylinders and a second hydraulic circuit for controlling the hydraulic pressure transmitted to the other two wheel cylinders, and transmitting the hydraulic pressure discharged from the hydraulic pressure supply apparatus to the wheel cylinders of the respective wheels; a simulation apparatus for providing a reaction force in accordance with a pedal effort of the brake pedal; a reservoir passage connecting the reservoir and the master chamber; a backup passage connecting the master chamber to the first hydraulic circuit and the second hydraulic circuit; a branch passage connecting the master chamber and the simulation apparatus; and a redundancy control apparatus provided between the hydraulic control unit and the wheel cylinders, and generating hydraulic pressure using a motor and a pump to transmit to at least one of the wheel cylinders.

Further, the redundancy control apparatus includes an isolation valve closed to prevent the hydraulic pressure transmit from the hydraulic control unit to the wheel cylinders in the event of a system abnormality, a pump for receiving and pressurizing oil from the reservoir, a motor for driving the pump, and a switching valve provided between the pump and the wheel cylinders to control the flow of oil pressurized by the pump.

Further, the hydraulic control unit includes a first circuit flow passage connected to any one of the wheel cylinders and a second circuit flow passage connected to the other wheel cylinders, the isolation valve includes a first isolation valve provided in the first circuit flow passage and a second isolation valve provided in the second circuit flow passage.

The redundancy control apparatus further includes a connection flow passage for connecting a downstream side of the first isolation valve and a downstream side of the second isolation valve.

Further, the pump is provided in a pair, and the pair of pumps is provided between the connection flow passage and the reservoir.

Further, the switching valve is provided in the connection flow passage, and includes a first switching valve for controlling the flow of oil toward the first circuit flow passage and a second switching valve for controlling the flow of oil toward the second circuit flow passage.

Further, the hydraulic control unit includes a plurality of inlet valves for controlling the flow of oil supplied to each of the wheel cylinders, the first circuit flow passage and the second circuit flow passage are connecting a downstream of the inlet valves and the wheel cylinders, respectively.

Further, the redundancy control apparatus operates in a fallback mode.

In accordance with another aspect of the present disclosure, an electronic brake system may include a reservoir to store oil; a master cylinder having a master piston connected to a brake pedal and a master chamber for discharging oil by a displacement of the master piston; a hydraulic pressure supply apparatus generating hydraulic pressure by an electrical signal output corresponding to a displacement of the brake pedal to supply to wheel cylinders of the respective wheels; a hydraulic control unit having a first hydraulic circuit for controlling the hydraulic pressure transmitted to the two wheel cylinders and a second hydraulic circuit for controlling the hydraulic pressure transmitted to the other two wheel cylinders, and transmitting the hydraulic pressure discharged from the hydraulic pressure supply apparatus to the wheel cylinders of the respective wheels; and a redundancy control apparatus provided between the hydraulic control unit and the wheel cylinders, and generating hydraulic pressure using a motor and a pump to transmit to at least one of the wheel cylinders, wherein the redundancy control apparatus comprises: an isolation valve closed to prevent the hydraulic pressure transmit from the hydraulic control unit to the wheel cylinders in the event of a system abnormality, a pump for receiving and pressurizing oil from the reservoir, a motor for driving the pump, and a switching valve provided between the pump and the wheel cylinders to control the flow of oil pressurized by the pump.

Further, a backup passage directly connecting the master cylinder to the first hydraulic circuit and the second hydraulic circuit without a valve intervention.

Further, wherein the backup passage provides with a check valve to block the flow of oil flowing into the master cylinder from the hydraulic pressure supply apparatus while allowing the flow of oil flowing from the master cylinder to the first hydraulic circuit and the second hydraulic circuit.

Further, the backup passage further comprises a first backup passage for connecting the master cylinder and the first hydraulic circuit and a second backup passage for connecting the master cylinder and the second hydraulic circuit.

Further, the check valve includes a first check valve provided in the first backup passage and a second check valve provided in the second backup passage.

Further, wherein the redundancy control apparatus operates in a fallback mode.

BRIEF DESCRIPTION OF THE DRAWINGS

The present disclosure will be described in detail with reference to the following drawings, which illustrate preferred embodiments of the present disclosure, and thus the technical idea of the present disclosure should not be construed as being limited thereto.

DETAILED DESCRIPTION

Hereinafter, the embodiments of the present disclosure will be described in detail with reference to accompanying drawings. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
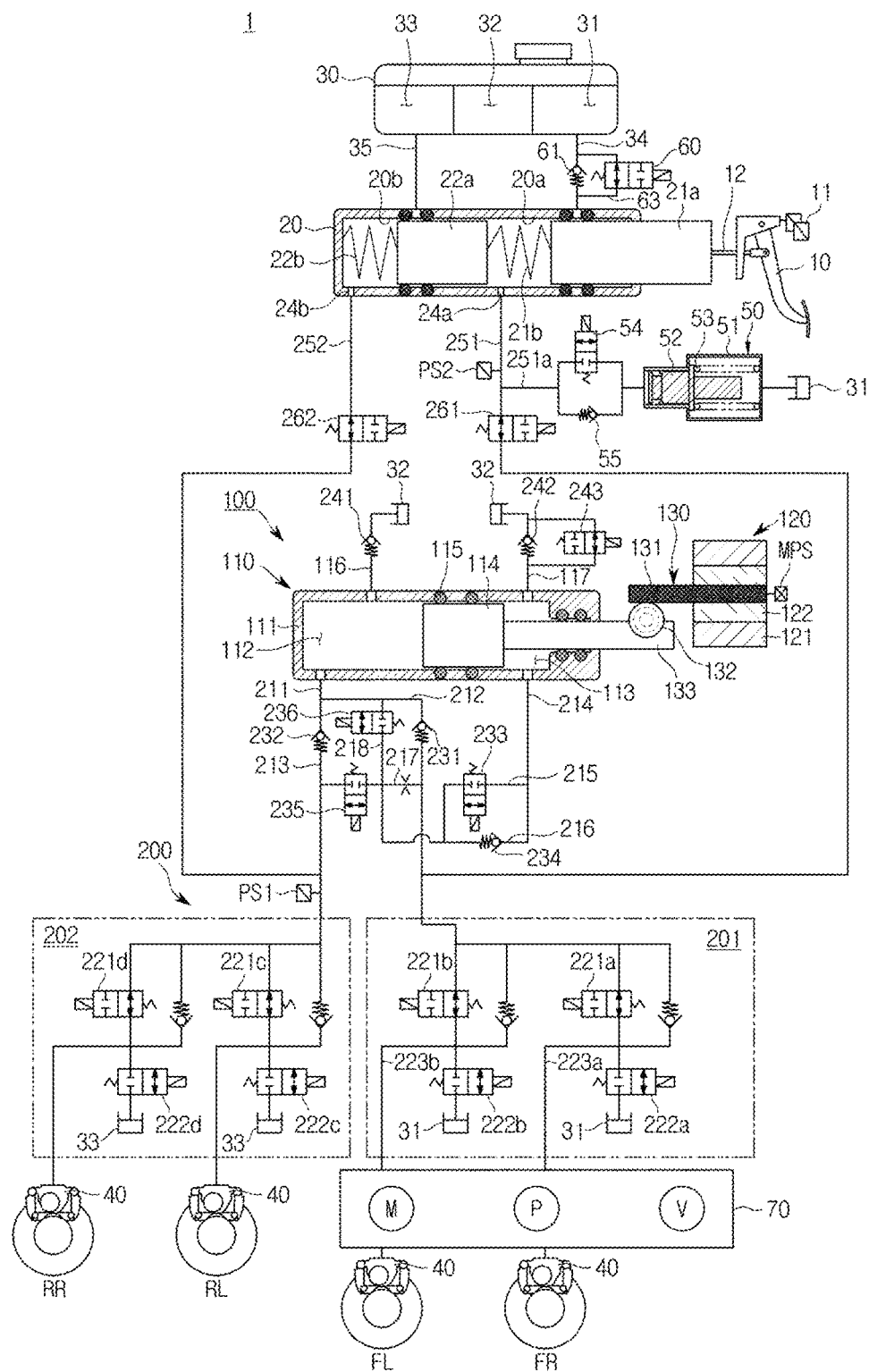
FIG. 1 is a hydraulic circuit diagram showing a non-braking state of an electronic brake system according to a first embodiment of the present disclosure.

FIG. 1 is a hydraulic circuit diagram showing a non-braking state of an electronic brake system according to a first embodiment of the present disclosure.

Referring to FIG. 1, an electronic brake system 1 typically includes a master cylinder 20 for generating a hydraulic pressure, a reservoir 30 coupled to an upper portion of the master cylinder 20 to store oil, an input rod 12 for pressing the master cylinder 20 in accordance with a pedal effort of the brake pedal 10, wheel cylinders 40 that receive the hydraulic pressure and perform braking of each of wheels FL, RR, RL, and FR, a pedal displacement sensor 11 for sensing the displacement of the brake pedal 10, and a simulation apparatus 50 for providing a reaction force in accordance with the pedal effort of the brake pedal 10.

The master cylinder 20 may be configured to include at least one chamber to generate hydraulic pressure. As an example, the master cylinder 20 may include a first master chamber 20a and a second master chamber 20b.

The first master chamber 20a is provided with a first piston 21a connected to the input rod 12 and the second master chamber 20b is provided with a second piston 22a. The first master chamber 20a communicates with a first hydraulic pressure port 24a to allow the oil to flow in and out and the second master chamber 20b communicates with a second hydraulic pressure port 24b to allow the oil to flow in and out. For example, the first hydraulic pressure port 24a may be connected to a first backup passage 251, and the second hydraulic pressure port 24b may be connected to a second backup passage 252.

The master cylinder 20 has the two master chambers 20a and 20b to ensure safety in case of failure. For example, one master chamber 20a of the two master chambers 20a and 20b may be connected to the front right wheel FR and the front left wheel FL of a vehicle through the first backup passage 251, and the other master chamber 20b may be connected to the rear left wheel RL and the rear right wheel RR of the vehicle through the second backup passage 252. In this way, the two master chambers 20a and 20b may be independently configured to enable braking of the vehicle even if one of the master chambers fails. In addition, the positions of the wheels connected to the master chamber of the master cylinder 20 may be variously configured.

A first spring 21b may be provided between the first piston 21a and the second piston 22a of the master cylinder 20, and a second spring 22b may be provided between the second piston 22a and an end of the master cylinder 20. That is, the first spring 21b may be accommodated in the first master chamber 20a, and the second spring 22b may be accommodated in the second master chamber 20b.

The first spring 21b and the second spring 22b are compressed by the first piston 21a and the second piston 22a which move as the displacement of the brake pedal 10 changes, so that the elastic force is stored. When the pushing force of the first piston 21a becomes smaller than the elastic force, the first and second pistons 21a and 22a may be returned to the original state by using the restoring elastic force stored in the first spring 21b and the second spring 22b.

The input rod 12 for pressing the first piston 21a of the master cylinder 20 may be brought into close contact with the first piston 21a. That is, a gap between the master cylinder 20 and the input rod 12 may not exist. Therefore, when the brake pedal 10 is depressed, the master cylinder 20 may be directly pressed without a pedal invalid stroke section.

The first master chamber 20a may be connected to the reservoir 30 through a first reservoir passage 34. The second master chamber 20b may be connected to the reservoir 30 through a second reservoir passage 35.

A check valve 61, which allows the flow of oil flowing from the reservoir 30 to the first master chamber 20a while blocking the flow of oil flowing into the reservoir 30 from the first master chamber 20a, may be provided on the first reservoir passage 34. That is, the check valve 61 may be provided to allow only one directional fluid flow. The front and rear of the check valve 61 of the first reservoir passage 34 may be connected by a bypass passage 63. An inspection valve 60 may be provided on the bypass passage 63.

The inspection valve 60 may be provided as a bidirectional control valve for controlling the flow of oil between the reservoir 30 and the master cylinder 20. The inspection valve 60 may be provided as a normally open type solenoid valve that operates to be closed when receiving a closing signal from an electronic control unit, which preforms overall control of the system, in a normally open state. The specific function and operation of the inspection valve 60 will be described later.

The reservoir 30 may include three reservoir chambers 31, 32 and 33, and the three reservoir chambers 31, 32 and 33 may be arranged side by side in a row.

The adjacent reservoir chambers 31, 32 and 33 may be partitioned by partitions. Each of the partitions may be partially opened to allow the first to third reservoir chambers 31, 32 and 33 to communicate with each other. Therefore, the pressures of the first to third reservoir chambers 31, 32 and 33 may all be the same, and the pressures of the first to third reservoir chambers 31, 32 and 33 may be formed at atmospheric pressure.

The first reservoir chamber 31 may be connected to the first master chamber 20a of the master cylinder 20, the wheel cylinders 40 and the simulation apparatus 50.

The first reservoir chamber 31 may be connected to the first master chamber 20a through the first reservoir passage 34, and may be connected to two wheel cylinders of the four wheel cylinders 40, as an example, to the wheel cylinders 40 of a first hydraulic circuit 201 provided on the front left wheel FL and the front right wheel FR.

The connection between the first reservoir chamber 31 and the first master chamber 20a may be controlled by the check valve 61 and the inspection valve 60. The connection between the first reservoir chamber 31 and the simulation apparatus 50 may be controlled by a simulator valve 54 and a simulator check valve 55. And, the connection between the first reservoir chamber 31 and the wheel cylinders 40 may be controlled by first and second outlet valves 222a and 222b.

The second reservoir chamber 32 may be connected to a hydraulic pressure supply apparatus 100.

The second reservoir chamber 32 may be connected to a first pressure chamber 112 and a second pressure chamber 113 of a hydraulic pressure providing unit 110 of the hydraulic pressure supply apparatus 100. Specifically, the second reservoir chamber 32 may be connected to the first pressure chamber 112 through a first dump passage 116 and to the second pressure chamber 113 through a second dump passage 117. Alternatively, the second reservoir chamber 32 may be connected to various hydraulic pressure supply apparatuses. As an example, the second reservoir chamber 32 may be connected to a pump.

The third reservoir chamber 33 may be connected to the second master chamber 20b of the master cylinder 20 and the wheel cylinders 40.

The third reservoir chamber 33 may be connected to the second master chamber 20b through the second reservoir passage 35. The third reservoir chamber 33 may also be connected to the wheel cylinders of a second hydraulic circuit 202 provided on the other two wheel cylinders of the four wheel cylinders 40, as an example, to the wheel cylinders 40 of the second hydraulic circuit 202 provided on the rear right wheel RR and the rear left wheel RL. The connection between the third reservoir chamber 33 and the wheel cylinders 40 may be controlled by third and fourth outlet valves 222c and 222d.

The reservoir 30 may be configured such that the second reservoir chamber 32 that is connected to the hydraulic pressure supply apparatus 100 and the first and third reservoir chambers 31 and 33 that are connected to the first and second master chambers 20a and 20b are separated from each other. This is because that if the reservoir chamber for supplying oil to the hydraulic pressure supply apparatus 100 and the reservoir chambers for supplying oil to the first and second master chambers 20a and 20b are provided as one unit, the reservoir 20 also does not properly supply oil to the first and second master chambers 20a and 20b when the reservoir 20 fails to properly supply oil to the hydraulic pressure supply apparatus 100.

Therefore, the reservoir 30 is provided such that the second reservoir chamber 32 and the first and third reservoir chambers 31 and 33 are separated from each other, so that in an emergency in which oil fails to be properly supplied to the hydraulic pressure supply apparatus 100, the reservoir 30 may supply oil normally to the first and second master chambers 20a and 20b so that emergency braking may be performed.

The reservoir 30 may be provided such that the first reservoir chamber 31 connected to the first master chamber 20a and the third reservoir chamber 33 connected to the second master chamber 20b are separated from each other. This is because that if the reservoir chamber for supplying oil to the first master chamber 20a and the reservoir chamber for supplying oil to the second master chamber 20b are provided as one unit, the reservoir 20 also does not properly supply oil to the second master chamber 20b when the reservoir 20 fails to properly supply oil to the first master chamber 20a.

Therefore, the reservoir 30 is provided such that the first reservoir chamber 31 and the third reservoir chamber 33 are separated from each other, so that in an emergency in which oil fails to be properly supplied to the first master chamber 20a, the reservoir 30 may supply oil normally to the second master chamber 20b so that a braking pressure may be formed in two wheel cylinders of the four wheel cylinders 40.

The reservoir 30 may be provided such that an oil line connected to the reservoir 30 from the hydraulic pressure supply apparatus 100 and a dump line connected to the reservoir 30 from the wheel cylinders 40 are separated from each other.

Therefore, it is possible to prevent bubbles, which may occur in the dump line at the time of the ABS braking, from flowing into the first and second pressure chambers 112 and 113 of the hydraulic pressure supply apparatus 100, thereby preventing the ABS performance from being degraded.

Meanwhile, the simulation apparatus 50 may be provided on a branch passage 251a branched from the first backup passage 251 to the first reservoir chamber 31, which will be described later, to provide a reaction force in accordance with the pedal effort of the brake pedal 10. The reaction force is provided as much as compensating the pedal effort provided by a driver through the simulation apparatus 50 so that the driver may finely regulate the braking force as intended.

The simulation apparatus 50 includes a pedal simulator provided on the branch passage 251a to store the oil flowing out from the first hydraulic pressure port 24a of the master cylinder 20 that has a simulation chamber 51, a reaction force piston 52 provided in the simulation chamber 51 and a reaction force spring 53 elastically supporting the reaction force piston 52, and a simulator valve 54 connected to a front portion of the simulation chamber 51.

The reaction force piston 52 and the reaction force spring 53 are installed so as to have a certain range of displacement in the simulation chamber 51 by the oil introduced into the simulation chamber 51.

The reaction force spring 53 shown in the drawing is only one embodiment capable of providing an elastic force to the reaction force piston 52 and may include various embodiments capable of storing the elastic force by deforming the shape. For example, the reaction force spring 53 includes various members capable of storing an elastic force by being made of a material such as rubber or having a coil or a plate shape.

The simulator valve 54 may connect the master cylinder 20 and the front portion of the simulation chamber 51. A rear portion of the simulation chamber 51 may be connected to the reservoir 30. Therefore, even when the reaction force piston 52 is returned, the oil in the reservoir 30 inflows through the simulation valve 51, so that the entire interior of the simulation chamber 51 may be filled with the oil.

The simulator valve 54 may be configured as a normally closed type solenoid valve that is normally kept closed. The simulator valve 54 may be opened when a driver presses the brake pedal 10 to deliver the oil in the simulation chamber 51 to the reservoir 30.

Further, the simulator valve 54 may be provided with the simulator check valve 55 in parallel. The simulator check valve 55 may ensure a quick return of the pedal simulator pressure when the brake pedal 10 is released.

The operation of the pedal simulation apparatus 50 will be briefly described below. When a driver depresses the brake pedal 10, the oil in the simulation chamber 51 is transmitted to the reservoir 30 as the reaction force piston 52 of the pedal simulator pushes the reaction force spring 53, and the driver is provided with a sense of pedaling in this process. On the contrary, when the driver releases the pedal effort applied to the brake pedal 10, the reaction force spring 53 pushes the reaction force piston 52 to be returned to the original state, and the oil in the reservoir 30 may flow into the simulation chamber 51 to fully fill the inside of the simulation chamber 51.

As such, since the inside of the simulation chamber 51 is always filled with oil, the friction of the reaction force piston 52 is minimized during operation of the simulation apparatus 50 so that the durability of the simulation apparatus 50 may be improved and the inflow of foreign matter from the outside may be blocked.

The electronic brake system 1 according to an embodiment of the present disclosure may include the hydraulic pressure supply apparatus 100 which mechanically operates by receiving an electrical signal of a driver's braking will from the pedal displacement sensor 11 which detects the displacement of the brake pedal 10, a hydraulic control unit 200 composed of the first and second hydraulic circuits 201 and 202 for controlling the flow of hydraulic pressure transmitted to the wheel cylinders 40 provided on the two wheels RR and RL or FL and FR, a first cut valve 261 provided on the first backup passage 251 that connects the first hydraulic pressure port 24a and the first hydraulic circuit 201 to control the flow of hydraulic pressure, a second cut valve 262 provided on the second backup passage 252 that connects the second hydraulic pressure port 24b and the second hydraulic circuit 202 to control the flow of hydraulic pressure, and an electronic control unit for controlling the hydraulic pressure supply apparatus 100 and valves 54, 60, 76 221a, 221b, 221c, 221d, 222a, 222b, 222c, 222d, 233, 235, 236 and 243 based on hydraulic pressure information and pedal displacement information.

The hydraulic pressure supply apparatus 100 may include the hydraulic pressure providing unit 110 for providing hydraulic pressure delivered to the wheel cylinders 40, a motor 120 for generating a rotational force by an electrical signal of the pedal displacement sensor 11, and a power converting unit 130 for converting the rotational motion of the motor 120 into a linear motion and transmitting the linear motion to the hydraulic pressure providing unit 110. Alternatively, the hydraulic pressure providing unit 110 may be operated by the pressure supplied from a high pressure accumulator, not by the driving force supplied from the motor 120.

The hydraulic pressure providing unit 110 may include a cylinder block 111 in which pressure chambers for receiving and storing oil is formed, a hydraulic piston 114 accommodated in the cylinder block 111, sealing members 115 provided between the hydraulic piston 114 and the cylinder block 111 to seal pressure chambers, and a drive shaft 133 connected to the rear end of the hydraulic piston 114 to transmit the power output from the power converting unit 130 to the hydraulic piston 114.

The pressure chambers may include the first pressure chamber 112 positioned forward (forward direction, leftward direction in the drawing) of the hydraulic piston 114 and the second pressure chamber 113 positioned rearward (rearward direction, rightward in the drawing) of the hydraulic piston 114. That is, the first pressure chamber 112 is partitioned by the cylinder block 111 and the front end of the hydraulic piston 114 and is provided such that the volume thereof changes according to the movement of the hydraulic piston 114, and the second pressure chamber 113 is partitioned by the cylinder block 111 and the rear end of the hydraulic piston 114 and is provided such that the volume thereof changes according to the movement of the hydraulic piston 114.

The first pressure chamber 112 is connected to a first hydraulic passage 211 through a communication hole formed at the rear side of the cylinder block 111 and is connected to a fourth hydraulic passage 214 through a communication hole formed at the front side of the cylinder block 111. The first hydraulic passage 211 connects the first pressure chamber 112 and the first and second hydraulic circuits 201 and 202. The first hydraulic passage 211 may be branched to a second hydraulic passage 212 communicating with the first hydraulic circuit 201 and a third hydraulic passage 213 communicating with the second hydraulic circuit 202.

The fourth hydraulic passage 214 connects the second pressure chamber 113 and the first and second hydraulic circuits 201 and 202. The fourth hydraulic passage 214 may be branched to a fifth hydraulic passage 215 communicating with the first hydraulic circuit 201 and a sixth hydraulic passage 216 communicating with the second hydraulic circuit 202.

The sealing members 115 may include a piston sealing member provided between the hydraulic piston 114 and the cylinder block 111 to seal a gap between the first pressure chamber 112 and the second pressure chamber 113, and a drive shaft sealing member provided between the drive shaft 133 and the cylinder block 111 to seal a gap between the second pressure chamber 113 and the cylinder block 111. That is, the hydraulic pressure (or the negative pressure) of the first pressure chamber 112 generated by the forward or backward movement of the hydraulic piston 114 may not be leaked to the second pressure chamber 113 by blocking by the piston sealing member, and may be transmitted to the first and fourth hydraulic passages 211 and 214. In addition, the hydraulic pressure (or the negative pressure) of the second pressure chamber 113 generated by the forward or backward movement of the hydraulic piston 114 may not be leaked to the cylinder block 111 by blocking by the drive shaft sealing member.

The first and second pressure chambers 112 and 113 are connected to the reservoir 30 by the dump passages 116 and 117, respectively, so that the first and second pressure chambers 112 and 113 may receive and store oil from the reservoir 30, or the oil in the first pressure chamber 112 or the second pressure chamber 113 may be delivered to the reservoir 30. As an example, the dump passages 116 and 117 may include the first dump passage 116 branched from the first pressure chamber 112 and connected to the reservoir 30, and the second dump passage 117 branched from the second pressure chamber 113 and connected to the reservoir 30.

The first pressure chamber 112 is connected to the first dump passage 116 through a third communication hole formed on the front side thereof, and the second pressure chamber 113 is connected to the second dump passage 117 through a fourth communication hole formed on the rear side thereof.

The second hydraulic passage 212 may communicate with the first hydraulic circuit 201, and the third hydraulic passage 213 may communicate with the second hydraulic circuit 202. Therefore, the hydraulic pressure may be transmitted to the first hydraulic circuit 201 and the second hydraulic circuit 202 by forward movement of the hydraulic piston 114.

Further, the electronic brake system 1 according to a first embodiment of the present disclosure may include a first control valve 231 and a second control valve 232 provided on the second and third hydraulic passages 212 and 213, respectively, to control the flow of oil.

The first and second control valves 231 and 232 may be provided as check valves that allow only the oil flow in the direction from the first pressure chamber 112 to the first or second hydraulic circuit 201 or 202 and block the oil flow in the opposite direction. That is, the first or second control valve 231 or 232 may allow the hydraulic pressure of the first pressure chamber 112 to be transmitted to the first or second hydraulic circuit 201 or 202, but may prevent the hydraulic pressure of the first or second hydraulic circuit 201 or 202 from being leaked to the first pressure chamber 112 through the second or third hydraulic passage 212 or 213.

The fourth hydraulic passage 214 may be branched into the fifth hydraulic passage 215 and the sixth hydraulic passage 216 to communicate with both the first hydraulic circuit 201 and the second hydraulic circuit 202. As an example, the fifth hydraulic passage 215 branched from the fourth hydraulic passage 214 may communicate with the first hydraulic circuit 201, and the sixth hydraulic passage 216 branched from the fourth hydraulic passage 214 may communicate with the second hydraulic circuit 202. Therefore, the hydraulic pressure may be transmitted to both the first hydraulic circuit 201 and the second hydraulic circuit 202 by the backward movement of the hydraulic piston 114.

Further, the electronic brake system 1 according to the first embodiment of the present disclosure may include a third control valve 233 provided on the fifth hydraulic passage 215 to control the flow of oil, and a fourth control valve 234 provided on the sixth hydraulic passage 216 to control the flow of oil.

The third control valve 233 may be provided as a bidirectional control valve for controlling the oil flow between the second pressure chamber 113 and the first hydraulic circuit 201. The third control valve 233 may be provided as a normally closed type solenoid valve that operates to be opened when receiving an open signal from the electronic control unit in a normally closed state.

The fourth control valve 234 may be provided as a check valve that allows only the oil flow in the direction from the second pressure chamber 113 to the second hydraulic circuit 202 and blocks the oil flow in the opposite direction. That is, the fourth control valve 234 may prevent the hydraulic pressure in the second hydraulic circuit 202 from being leaked to the second pressure chamber 113 through the sixth hydraulic passage 216 and the fourth hydraulic passage 214.

Further, the electronic brake system 1 according to the first embodiment of the present disclosure may include a fifth control valve 235 provided on a seventh hydraulic passage 217 that connects the second hydraulic passage 212 and the third hydraulic passage 213 to control the flow of oil, and a sixth control valve 236 provided on an eighth hydraulic passage 218 that connects the second hydraulic passage 212 and the seventh hydraulic passage 217 to control the flow of oil. The fifth control valve 235 and the sixth control valve 236 may be provided as a normally closed type solenoid valve that operates to be opened when receiving an open signal from the electronic control unit in a normally closed state.

The fifth control valve 235 and the sixth control valve 236 may operate to be opened when an abnormality occurs in the first control valve 231 or the second control valve 232 so that the hydraulic pressure in the first pressure chamber 112 may be transmitted to both the first hydraulic circuit 201 and the second hydraulic circuit 202.

The fifth control valve 235 and the sixth control valve 236 may operate to be opened when the hydraulic pressure in the wheel cylinders 40 is exited and sent to the first pressure chamber 112. This is because the first control valve 231 and the second control valve 232 provided on the second hydraulic passage 212 and the third hydraulic passage 213 are provided as a check valve allowing only one directional oil flow.

Further, the electronic brake system 1 according to an embodiment of the present disclosure may include a first dump valve 241 and a second dump valve 242 provided on the first dump passage 116 and the second dump passage 117, respectively, to control the flow of oil. The first and second dump valves 241 and 242 may be provided as a check valve that is opened only in the direction from the reservoir 30 to the first or second pressure chamber 112 or 113 and closed in the opposite direction. That is, the first dump valve 241 may be a check valve that allows the oil to flow from the reservoir 30 to the first pressure chamber 112 while blocking the flow of oil from the first pressure chamber 112 to the reservoir 30, and the second dump valve 242 may be a check valve that allows the oil to flow from the reservoir 30 to the second pressure chamber 113 while blocking the flow of oil from the second pressure chamber 113 to the reservoir 30.

The second dump passage 117 may include a bypass passage, and a third dump valve 243 for controlling the flow of oil between the second pressure chamber 113 and the reservoir 30 may be installed on the bypass passage.

The third dump valve 243 may be provided as a solenoid valve capable of controlling the bidirectional flow, and may also be provided as a normally open type solenoid valve that operates to be closed when receiving a closing signal from the electronic control unit in a normally open state.

Meanwhile, the hydraulic pressure providing unit 110 of the electronic brake system 1 according to the first embodiment of the present disclosure may operate in a double acting manner. That is, the hydraulic pressure generated in the first pressure chamber 112 as the hydraulic piston 114 advances is transmitted to the first hydraulic circuit 201 through the first hydraulic passage 211 and the second hydraulic passage 212 to operate the wheel cylinders 40 installed on the front right wheel FR and the front left wheel FL, and is transmitted to the second hydraulic circuit 202 through the first hydraulic passage 211 and the third hydraulic passage 213 to operate the wheel cylinders 40 installed on the rear right wheel RR and the rear left wheel RL.

Likewise, the hydraulic pressure generated in the second pressure chamber 113 as the hydraulic piston 114 moves backward is transmitted to the first hydraulic circuit 201 through the fourth hydraulic passage 214 and the fifth hydraulic passage 215 to operate the wheel cylinders 40 installed on the front light wheel FR and the front left wheel FL, and is transmitted to the second hydraulic circuit 202 through the fourth hydraulic passage 214 and the sixth hydraulic passage 216 to operate the wheel cylinders 40 installed on the rear right wheel RR and the rear left wheel RL.

The negative pressure generated in the first pressure chamber 112 while the hydraulic piston 114 moves backward may suck oil in the wheel cylinders 40 installed on the front right wheel FR and the front left wheel FL and transmit the oil to the first pressure chamber 112 through the first hydraulic circuit 201, the second hydraulic passage 212 and the first hydraulic passage 211, and may suck oil in the wheel cylinders 40 installed on the rear right wheel RR and the rear left wheel RL and transmit the oil to the first pressure chamber 112 through the second hydraulic circuit 202, the third hydraulic passage 213 and the first hydraulic passage 211.

Next, the motor 120 and the power converting unit 130 of the hydraulic pressure supply apparatus 100 will be described.

The motor 120 which is a device for generating a rotational force by a signal output from the electronic control unit (ECU, not shown) may generate a rotational force in a forward or reverse direction. The rotational angular velocity and rotation angle of the motor 120 may be precisely controlled. Since the motor 120 is a well-known technology, a detailed description thereof will be omitted.

The electronic control unit (ECU) may include an algorithm for performing overall control of the electronic brake system, or a memory for storing data for a program reproducing the algorithm, and a microprocessor for implementing an operation necessary for controlling the electronic brake system using the data stored in the memory. The memory and the processor may be implemented as separate chips or a single chip.

The electronic control unit controls the valves 54, 60, 221a, 221b, 221c, 221d, 222a, 222b, 222c, 222d, 233, 235, 236, 243 and 245 included in the electronic brake system 1, which includes the motor 120. The operation in which a plurality of valves is controlled according to the displacement of the brake pedal 10 will be described later.

The driving force of the motor 120 causes the displacement of the hydraulic piston 114 through the power converting unit 130, and the hydraulic pressure generated by the sliding movement of the hydraulic piston 114 in the pressure chambers is transmitted to the wheel cylinders 40 installed on the respective wheels RR, RL, FR and FL through the first and second hydraulic passages 211 and 212. A brushless motor including a stator 121 and a rotor 122 may be used as the motor 120.

The power converting unit 130 which is a device for converting a rotational force into a linear motion may include a worm shaft 131, a worm wheel 132, and the drive shaft 133, as an example.

The worm shaft 131 may be integrally formed with a rotation shaft of the motor 120, and rotates the worm wheel 132 by forming a worm that engages with the worm wheel 132 on the outer circumferential surface thereof. The worm wheel 132 is coupled to be engaged with the drive shaft 133 to move the drive shaft 133 linearly, and the drive shaft 133 is connected to the hydraulic piston 114 to slide the hydraulic piston 114 in the cylinder block 111.

The above operations will be described again below. A signal sensed by the pedal displacement sensor 11 as a displacement occurs in the brake pedal 10 is transmitted to the electronic control unit (ECU), and the electronic control unit drives the motor 120 in one direction to rotate the worm shaft 131 in one direction. The rotational force of the worm shaft 131 is transmitted to the drive shaft 133 via the worm wheel 132, and the hydraulic piston 114 connected to the drive shaft 133 moves forward to generate a hydraulic pressure to the first pressure chamber 112.

On the contrary, when the pedal effort on the brake pedal 10 is released, the electronic control unit drives the motor 120 in the opposite direction to rotate the worm shaft 131 in the opposite direction. Accordingly, the worm wheel 132 also rotates in the opposite direction and the hydraulic piston 114 connected to the drive shaft 133 returns (moves backward), thereby generating a negative pressure in the first pressure chamber 112.

Meanwhile, the hydraulic pressure and the negative pressure may be generated in a direction opposite to the above. That is, a signal sensed by the pedal displacement sensor 11 as a displacement occurs in the brake pedal 10 is transmitted to the electronic control unit (ECU) (not shown), and the electronic control unit drives the motor 120 in the opposite direction to rotate the worm shaft 131 in the opposite direction. The rotational force of the worm shaft 131 is transmitted to the drive shaft 133 via the worm wheel 132 and the hydraulic piston 114 connected to the drive shaft 133 moves backward, thereby generating a hydraulic pressure in the second pressure chamber 113.

On the contrary, when the pedal effort on the brake pedal 10 is released, the electronic control unit drives the motor 120 in one direction so that the worm shaft 131 rotates in one direction. Accordingly, the worm wheel 132 also rotates in the opposite direction and the hydraulic piston 114 connected to the drive shaft 133 returns (advances), thereby generating a negative pressure in the second pressure chamber 113.

As such, the hydraulic pressure supply apparatus 100 performs the function of transmitting the hydraulic pressure to the wheel cylinders 40 or sucking and transmitting the hydraulic pressure to the reservoir 30 in accordance with the rotational direction of the rotational force generated from the motor 120.

When the motor 120 rotates in one direction, a hydraulic pressure may be generated in the first pressure chamber 112 or a negative pressure may be generated in the second pressure chamber 113. In such a case, whether to brake by using the hydraulic pressure or to release the braking by using the negative pressure may be determined by controlling the valves 221a, 221b, 221c, 221d, 222a, 222b, 222c, 222d, 233, 235, 236 and 243.

Although not shown in the drawings, the power converting unit 130 may be constituted by a ball screw nut assembly. The power converting unit 130 may include, for example, a screw integrally formed with the rotation shaft of the motor 120 or connected to rotate together with the rotation shaft of the motor 120, and a ball nut that is screwed with the screw in a limited rotation state and linearly moves according to the rotation of the screw. The hydraulic piston 114 is connected to the ball nut of the power converting unit 130 and presses the pressure chambers by the linear movement of the ball nut. The structure of such a ball screw nut assembly is a publicly known apparatus for converting a rotational motion into a linear motion, and thus a detailed description thereof will be omitted.

It should be understood that the power converting unit 130 according to the first embodiment of the present disclosure may adopt any structure other than the structure of the ball screw nut assembly as long as the structure may convert a rotational motion into a linear motion.

Further, the electronic brake system 1 according to the first embodiment of the present disclosure may include the first and second backup passages 251 and 252 capable of directly supplying the oil discharged from the master cylinder 20 to the wheel cylinders 40 when operating abnormally.

A first cut valve 261 for controlling the flow of oil may be provided on the first backup passage 251. A second cut valve 262 for controlling the flow of oil may be provided on the second backup passage 252. Further, the first backup passage 251 may connect the first hydraulic pressure port 24a and the first hydraulic circuit 201, and the second backup passage 252 may connect the second hydraulic pressure port 24b and the second hydraulic circuit 202.

The first and second cut valves 261 and 262 may be provided as a normally open type solenoid valve that operates to be closed when receiving a closing signal from the electronic control unit in a normally open state.

Next, the hydraulic control unit 200 according to the first embodiment of the present disclosure will be described.

The hydraulic control unit 200 may include the first hydraulic circuit 201 and the second hydraulic circuit 202, each of which receives hydraulic pressure and controls two wheels, respectively. As an example, the first hydraulic circuit 201 may control the front right wheel FR and the front left wheel FL, and the second hydraulic circuit 202 may control the rear left wheel RL and the rear right wheel RR. The wheel cylinders 40 are provided on the respective wheels FR, FL, RR, and RL to receive the hydraulic pressure and perform braking.

The first hydraulic circuit 201 is connected to the first hydraulic passage 211 and the second hydraulic passage 212 and is supplied with the hydraulic pressure from the hydraulic pressure supply apparatus 100, and the second hydraulic passage 212 is branched into two flow passages connected to the front right wheel FR and the rear left wheel RL. Likewise, the second hydraulic circuit 202 is connected to the first hydraulic passage 211 and the third hydraulic passage 213 and is supplied with the hydraulic pressure from the hydraulic pressure supply apparatus 100, and the third hydraulic passage 213 is branched into two flow passages connected to the front left wheel FL and the rear right wheel RR.

The first and second hydraulic circuits 201 and 202 may include a plurality of inlet valves 221 (221a, 221b, 221c, and 221d) to control the flow of hydraulic pressure. As an example, the first hydraulic circuit 201 may be provided with the two inlet valves 221a and 221b that are connected to the first hydraulic passage 211 to control the hydraulic pressure transmitted to the two wheel cylinders 40, respectively. Further, the second hydraulic circuit 202 may be provided with the two inlet valves 221c and 221d that are connected to the second hydraulic passage 212 to control the hydraulic pressure transmitted to the two wheel cylinders 40, respectively.

The inlet valves 221 are disposed on an upstream side of the wheel cylinders 40, and may be provided as a normally open type solenoid valve that operates to be closed when receiving a close signal from the electronic control unit in a normally open state.

The first and second hydraulic circuits 201 and 202 may include a plurality of outlet valves 222 (222a, 222b, 222c and 222d) connected to the reservoir 30 in order to improve the performance when releasing the brake. The outlet valves 222 are connected to the wheel cylinders 40, respectively, to control the hydraulic pressure that escapes from each of the wheels FL, RR, RL and FR. That is, the outlet valves 222 may sense the braking pressure of each of the wheels FL, RR, RL and FR and may be selectively opened to control the pressure when the pressure reduction braking is required.

The outlet valves 222 may be provided as a normally closed type solenoid valve that operates to be opened when receiving an open signal from the electronic control unit in a normally closed state.

The hydraulic control unit 200 may be connected to the first and second backup passages 251 and 252. As an example, the first hydraulic circuit 201 may be connected to the first backup passage 251 to be supplied with the hydraulic pressure from the master cylinder 20, and the second hydraulic circuit 202 may be connected to the second backup passage 252 to be supplied with the hydraulic pressure from the master cylinder 20.

At this time, the first backup passage 251 may join with the first hydraulic circuit 201 upstream of the first and second inlet valves 221a and 221b. Likewise, the second backup passage 252 may join with the second hydraulic circuit 202 upstream of the third and fourth inlet valves 221c and 221d. Accordingly, the hydraulic pressure provided from the hydraulic pressure supply apparatus 100 may be supplied to the wheel cylinders 40 through the first and second hydraulic circuits 201 and 202 when the first and second cut valves 261 and 262 are closed, and the hydraulic pressure provided from the master cylinder 20 may be supplied to the wheel cylinders 40 through the first and second backup passages 251 and 252 when the first and second cut valves 261 and 262 are opened. At this time, since the plurality of inlet valves 221a, 221b, 221c and 221d is in an open state, there is no need to switch the operation state.

Meanwhile, the electronic brake system 1 according to the first embodiment of the present disclosure may include a redundancy control apparatus 70 that generates hydraulic pressure in the event of a system abnormality, such as a system error or malfunction, to enable rapid auxiliary braking.

Figure 2:
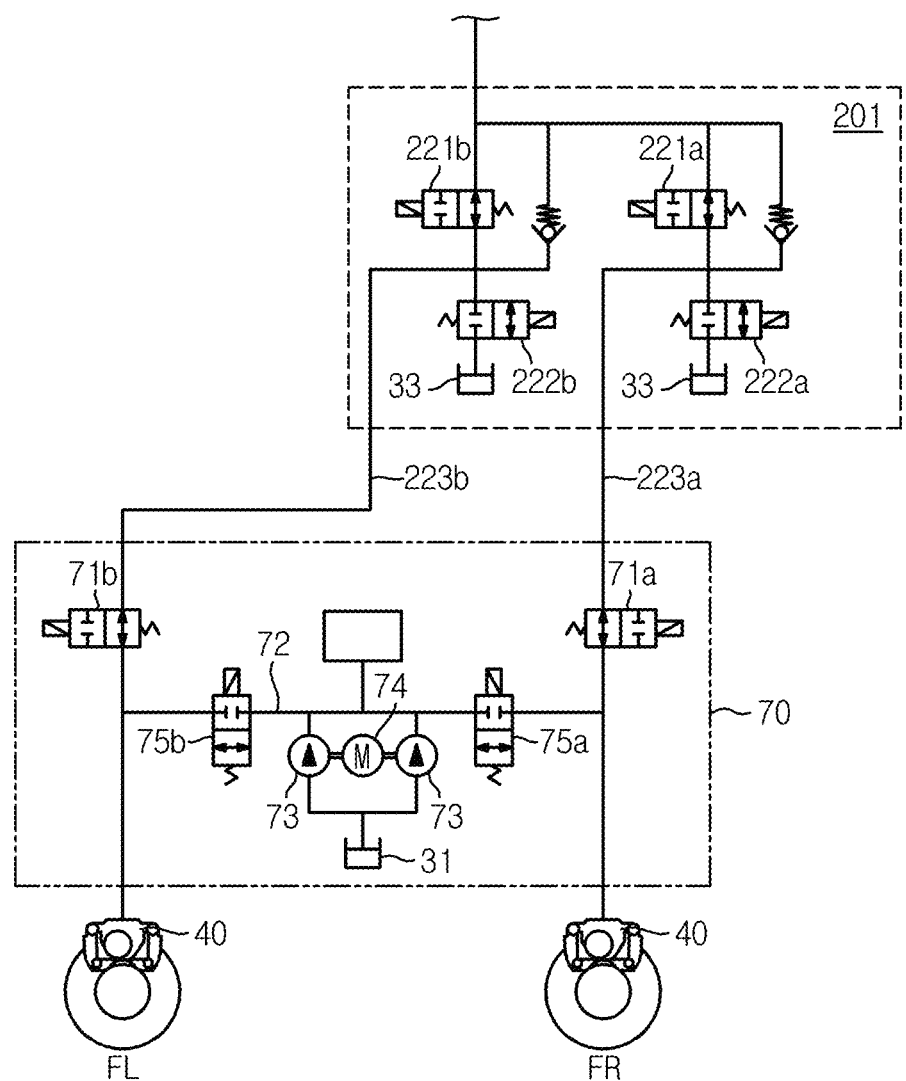
FIG. 2 is a hydraulic circuit diagram of a redundancy control apparatus in the electronic brake system according to the first embodiment of the present disclosure.

FIG. 2 is a hydraulic circuit diagram of the redundancy control apparatus in the electronic brake system according to the first embodiment of the present disclosure.

As shown in FIG. 2, the redundancy control apparatus 70 may be provided on the flow passages supplied to the wheel cylinders 40 installed on the front left wheel FL and the front right wheel FR from the first hydraulic circuit 201. As an example, the redundancy control apparatus 70 may be provided on a first circuit flow passage 223a for supplying a hydraulic pressure from the first hydraulic circuit 201 to the wheel cylinder 40 disposed on the front right wheel FR and a second circuit flow passage 223b for supplying fluid pressure from the first hydraulic circuit 201 to the wheel cylinder 40 disposed on the front left FL.

The redundancy control apparatus 70 may include a first isolation valve 71a provided on the first circuit flow passage 223a for controlling the flow of hydraulic pressure, a second isolation valve 71b provided on the second circuit flow passage 223b for controlling the flow of hydraulic pressure, a connecting flow passage 72 for connecting the first circuit flow passage 223a and the second circuit flow passage 223b from a downstream side of the first isolation valve 71a and the second isolation valve 71b, two pumps 73 provided between the connecting flow passage 72 and the first reservoir chamber 31, a motor 74 for driving the pumps 73, a first switching valve 75a provided on the connecting flow passage 72 for controlling the flow of hydraulic pressure supplied to the wheel cylinder 40 disposed on the front right wheel FR from the pump 73, and a second switching valve 75b provided on the connecting flow passage 72 for controlling the flow of hydraulic pressure supplied to the wheel cylinder 40 disposed on the front left wheel FL from the pump 73. The connecting flow passage 72 may include a bypass flow passage connecting the front side and rear side of the pumps 73.

The first isolation valve 71a and the second isolation valve 71b may be provided as a normally open type solenoid valve that operates to be closed when receiving a closing signal from the electronic control unit in a normally open state.

The first switching valve 75a and the second switching valve 75b are disposed on the upstream side of the wheel cylinders 40, and may be provided as a normally close type solenoid valve that operates to be opened when receiving an open signal from the electronic control unit in a normally closed state.

The redundancy control apparatus 70 includes the motor M, the pumps P and the valves V, the number of motor, pump, and valves may be variously implemented according to system specifications.

The redundancy control apparatus 70 is provided between the first hydraulic circuit 201 and the two wheels at the installation position. However, the present disclosure is not limited to this, and the redundancy control apparatus 70 may be provided between the second hydraulic circuit 202 and the two wheels.

The redundancy control apparatus 70 may be provided between the hydraulic pressure supply apparatus 100 and the hydraulic circuits 201 and 202.

Further, the redundancy control apparatus 70 may be provided on the reservoir flow passages 34 and 35. In addition, it may be installed on various positions capable of providing hydraulic pressure to the wheel cylinders of the respective wheels.

Detailed functions and operations of the redundancy control apparatus 70 will be described later.

As shown in FIG. 1, Reference numeral "PS1", which is not described, is hydraulic passage pressure sensor that sense the hydraulic pressure of the first and second hydraulic circuits 201 and 202, and Reference numeral "PS2" is a backup passage pressure sensor that measures the hydraulic pressure of the master cylinder 20. In addition, Reference numeral "MPS" is a motor control sensor that controls the rotation angle or current of the motor 120.

Hereinafter, the operation of the electronic brake system 1 according to an embodiment of the present disclosure will be described in detail.

When the braking by a driver is started during normal operation of the system, a demanded braking amount of the driver may be sensed through information such as the pressure of the brake pedal 10 sensed by the pedal displacement sensor 11. The electronic control unit receives the electrical signal output from the pedal displacement sensor 11 and drives the motor 120.

Further, the electronic control unit may receive the magnitude of a regenerative braking amount through the backup passage pressure sensor PS2 provided at an outlet side of the master cylinder 20 and the hydraulic passage pressure sensor PS1 provided in the second hydraulic circuit 202, and may calculate the magnitude of a friction braking amount in accordance with the difference between the demanded braking amount of the driver and the regenerative braking amount to thereby grasp the magnitude of a pressure increase or a pressure decrease of the wheel cylinders 40.

When the driver depresses the brake pedal 10 during braking, the motor 120 is operated to rotate in one direction and the rotational force of the motor 120 is transmitted to the hydraulic pressure providing unit 110 by the power converting unit 130. The hydraulic piston 114 of the hydraulic pressure providing unit 110 advances to generate the hydraulic pressure in the first pressure chamber 112. The hydraulic pressure discharged from the hydraulic pressure providing unit 110 is transmitted to the wheel cylinders 40 provided on the four wheels through the first hydraulic circuit 201 and the second hydraulic circuit 202 to generate the braking force.

More specifically, the hydraulic pressure provided in the first pressure chamber 112 is directly transmitted to the wheel cylinders 40 provided on the two wheels FR and FL through the first hydraulic passage 211 and the second hydraulic passage 212. At this time, the first and second inlet valves 221*a* and 221*b*, which are respectively installed on two flow passages branched from the second hydraulic passage 212, are provided in the open state. In addition, the first and second outlet valves 222*a* and 222*b*, which are respectively installed on two flow passages branched from the two flow passages branched from the second hydraulic passage 212, are maintained in the closed state to prevent the hydraulic pressure from leaking to the reservoir 30.

The hydraulic pressure provided in the first pressure chamber 112 is directly transmitted to the wheel cylinders 40 provided on the two wheels RR and RL through the first hydraulic passage 211 and the third hydraulic passage 213. At this time, the third and fourth inlet valves 221*c* and 221*d*, which are respectively installed on two flow passages branched from the third hydraulic passage 213, are provided in the open state. In addition, the third and fourth outlet valves 222*c* and 222*d*, which are respectively installed on two flow passages branched from the two flow passages branched from the third hydraulic passage 213, are maintained in the closed state to prevent the hydraulic pressure from leaking to the reservoir 30.

The fifth control valve 235 and the sixth control valve 236 may be switched to the open state to open the seventh hydraulic passage 217 and the eighth hydraulic passage 218. As the seventh hydraulic passage 217 and the eighth hydraulic passage 218 are opened, the second hydraulic passage 212 and the third hydraulic passage 213 communicate with each other. However, at least one of the fifth control valve 235 and the sixth control valve 236 may be maintained in the closed state as necessary.

The third control valve 233 may be maintained in the closed state to block the fifth hydraulic passage 215. Through this, the hydraulic pressure generated in the first pressure chamber 112 is blocked from being transmitted to the second pressure chamber 113 through the fifth hydraulic passage 215 connected to the second hydraulic passage 212, thereby increasing the rate of pressure increase per stroke. Therefore, a quick braking response may be expected at the beginning of braking.

Meanwhile, if the pressure transmitted to the wheel cylinders 40 is measured to be higher than a target pressure value in accordance with a pedal effort of the brake pedal 10, the electronic control unit may open one or more of the first to fourth outlet valves 222 to control so as to follow the target pressure value.

Also, when the hydraulic pressure is generated in the hydraulic pressure supply apparatus 100, the first and second cut valves 261 and 262 provided on the first and second backup passages 251 and 252 connected to the first and second hydraulic pressure ports 24*a* and 24*b* of the master cylinder 20 are closed so that the hydraulic pressure discharged from the master cylinder 20 is not transmitted to the wheel cylinders 40.

Also, the pressure generated by the pressing of the master cylinder 20 according to the pedal effort of the brake pedal 10 is transmitted to the simulation apparatus 50 connected to the master cylinder 20. At this time, the normally closed type simulator valve 54 disposed at the front end of the simulation chamber 51 is opened so that the oil filled in the simulation chamber 51 is delivered to the reservoir 30 through the simulator valve 54. In addition, the reaction force piston 52 moves so that a pressure corresponding to the load of the reaction force spring 53 supporting the reaction force piston 52 is formed in the simulation chamber 51, thereby providing a proper pedal feeling to the driver.

The hydraulic passage pressure sensor PS1 may detect the flow rate delivered to the wheel cylinder 40 installed on the front left wheel FL or the rear right wheel RR (hereinafter, simply referred to as the wheel cylinder 40). Accordingly, the flow rate delivered to the wheel cylinder 40 may be controlled by controlling the hydraulic pressure supply apparatus 100 in accordance with the output of the hydraulic passage pressure sensor PS1. Specifically, the flow rate discharged from the wheel cylinder 40 and the discharge speed may be controlled by regulating the advancing distance and the advancing speed of the hydraulic piston 114.

Next, a case of releasing the braking force in the braking state in the normal operation of the electronic brake system 1 according to the first embodiment of the present disclosure will be described.

When the pedal effort applied to the brake pedal 10 is released, the motor 120 generates a rotational force in a direction opposite to the braking direction and transmits the rotational force to the power converting unit 130, and the worm shaft 131, the worm wheel 132 and the drive shaft 133 of the power converting unit 130 are rotated in the opposite direction to the braking direction to move the hydraulic piston 114 back to its original position, so that the pressure in the first pressure chamber 112 is released or a negative pressure is generated in the first pressure chamber 112. In addition, the hydraulic pressure providing unit 110 receives the hydraulic pressure discharged from the wheel cylinders 40 through the first and second hydraulic circuits 201 and 202 and transmits the hydraulic pressure to the first pressure chamber 112.

More specifically, the negative pressure generated in the first pressure chamber 112 releases the pressure of the wheel cylinders 40, which are provided on the two wheels FR and FL, through the first hydraulic passage 211 and the second hydraulic passage 212. At this time, the first and second inlet valves 221*a* and 221*b*, which are respectively installed on two flow passages branched from the second hydraulic passage 212, are provided in the open state. In addition, the first and second outlet valves 222*a* and 222*b*, which are respectively installed on two flow passages branched from the two flow passages branched from the second hydraulic passage 212, are maintained in the closed state to prevent oil in the reservoir 30 from being introduced.

Also, the negative pressure generated in the first pressure chamber 112 releases the pressure of the wheel cylinders 40, which are provided on the two wheels RL and RR, through the first hydraulic passage 211 and the third hydraulic passage 213. At this time, the third and fourth inlet valves 221*c* and 221*d*, which are respectively installed on two flow passages branched from the third hydraulic passage 213, are provided in the open state. In addition, the third and fourth outlet valves 222*c* and 222*d*, which are respectively installed on two flow passages branched from the third hydraulic passage 213, are maintained in the closed state to prevent oil in the reservoir 30 from being introduced.

The third control valve 233 is switched to the open state to open the fifth hydraulic passage 215, the fifth control valve 235 is switched to the open state to open the seventh hydraulic passage 217, and the sixth control valve 236 is switched to the open state to open the eighth hydraulic passage 218. As the fifth hydraulic passage 215, the seventh hydraulic passage 217 and the eighth hydraulic passage 218 communicate with each other, the first pressure chamber 112 and the second pressure chamber 113 communicate with each other.

Meanwhile, in order for a negative pressure to be formed in the first pressure chamber 112, the hydraulic piston 114 must move backward, but if oil is fully filled in the second pressure chamber 113, a resistance is generated when the hydraulic piston 114 is reversed. Accordingly, when the third control valve 233, the fifth control valve 235 and the sixth control valve 236 are opened so that the fourth hydraulic passage 214 and the fifth hydraulic passage 215 are communicated with the second hydraulic passage 212, the oil in the second pressure chamber 113 is moved to the first pressure chamber 112.

The third dump valve 243 may be switched to the closed state. By closing the third dump valve 243, the oil in the second pressure chamber 113 may be discharged only to the fourth hydraulic passage 214. However, in some cases, the third dump valve 243 may be maintained in the open state so that the oil in the second pressure chamber 113 may flow into the reservoir 30.

Meanwhile, in a case where the negative pressure transmitted to the first and second hydraulic circuits 201 and 202 is measured to be higher than a target pressure release value corresponding to the release amount of the brake pedal 10, the electronic control unit may open one or more of the first to fourth outlet valves 222 to control so as to follow the target pressure value.

Also, when a hydraulic pressure is generated in the hydraulic pressure supply apparatus 100, the first and second cut valves 261 and 262 provided on the first and second backup passages 251 and 252 connected to the first and second hydraulic pressure ports 24a and 24b of the master cylinder 20 are closed so that the negative pressure generated in the master cylinder 20 is not transmitted to the hydraulic control unit 200.

Next, a state in which the electronic brake system 1 according to the first embodiment of the present disclosure is actuated by an anti-lock braking system (ABS) will be described. In this embodiment, for example, the wheel cylinders 40 disposed on the front left wheel FL and the front right wheel FR are operated by the ABS, but the present disclosure is not limited thereto and may apply to various brake operations such as electronic stability control (ESC).

When the motor 120 operates according to the pedal effort of the brake pedal 10, a hydraulic pressure is generated as the rotational force of the motor 120 is transmitted to the hydraulic pressure providing unit 110 through the power converting unit 130. At this time, the first and second cut valves 261 and 262 are closed so that the hydraulic pressure discharged from the master cylinder 20 is not transmitted to the wheel cylinders 40.

The hydraulic piston 114 advances to generate the hydraulic pressure in the first pressure chamber 112, the fourth inlet valve 221d is provided in the open state and the hydraulic pressure transmitted through the first hydraulic passage 211 and the third hydraulic passage 213 actuates the wheel cylinder 40 disposed on the front left wheel FL, thereby generating a braking force.

At this time, the first to third inlet valves 221a, 221b and 221c are switched to the closed state, and the first to fourth outlet valves 222a, 222b, 222c and 222d are maintained in the closed state. In addition, the third dump valve 243 is provided in the open state so that the oil is filled from the reservoir 30 to the second pressure chamber 113.

Also, the hydraulic pressure piston 114 moves backward to generate the hydraulic pressure in the second pressure chamber 113, the first inlet valve 221a is provided in the open state and the hydraulic pressure transmitted through the fourth hydraulic passage 214 and the second hydraulic passage 212 actuates the wheel cylinder 40 disposed in the front right wheel FR, thereby generating a braking force.

At this time, the second to fourth inlet valves 221b, 221c and 221d are switched to the closed state, and the first to fourth outlet valves 222a, 222b, 222c and 222d are maintained in the closed state.

That is, the electronic brake system 1 according to an embodiment of the present disclosure may independently control the operation of the motor 120 and the respective valves 221a, 221b, 221c, 221d, 222a, 222b, 222c, 222d, 233, 235, 236 and 243 so that the hydraulic pressure may be selectively transmitted to or discharged from the wheel cylinders 40 of the wheels RL, RR, FL and FR according to the required pressure, and thus precise pressure control becomes possible.

Next, a fallback mode (hereinafter referred to as a manual fallback mode) in which braking is performed by operating the brake pedal of the driver when the electronic braking system 1 as above does not operate normally will be described.

In a case where the electronic brake system 1 is operated abnormally, the respective valves 54, 60, 221a, 221b, 221c, 221d, 222a, 222b, 222c, 222d, 233, 235, 236 and 243 are provided in an initial state of braking which is in a non-operating state.

When a driver presses the brake pedal 10, the input rod 12 connected to the brake pedal 10 advances, at the same time the first piston 21a in contact with the input rod 12 advances, and the second piston 22a also advances by the pressing or movement of the first piston 21a. At this time, since there is no gap between the input rod 12 and the first piston 21a, rapid braking may be performed.

The hydraulic pressure discharged from the master cylinder 20 by the pressurization or movement of the first piston 21a and the second piston 21b is directly transmitted to the wheel cylinders 40 through the first and second backup passages 251 and 252 connected for a backup brake, thereby performing the braking force.

At this time, the first and second cut valves 261 and 262 provided on the first and second backup passages 251 and 252 and the inlet valves 221 for opening and closing the flow passages of the first and second hydraulic circuits 201 and 202 are provided as normally open type solenoid valves, and the simulator valve 54 and the outlet valves 222 are provided as normally closed type solenoid valves, and thus the hydraulic pressure is immediately transmitted to the four wheel cylinders 40. Therefore, since stable braking may be performed, the braking stability is improved.

The electronic brake system 1 according to the first embodiment of the present disclosure may effectively discharge only the braking pressure provided to the corresponding wheel cylinders 40 through the first to fourth outlet valves 222a to 222d.

For example, in a case where the first to fourth inlet valves 221a to 221d are switched to the closed state, the first to third outlet valves 222a to 222c are maintained in the closed state, and the fourth outlet valve 222d is switched to the open state, the hydraulic pressure discharged from the wheel cylinder 40 provided on the rear right wheel RR is discharged to the third reservoir chamber 33 through the fourth outlet valve 222d.

The reason why the hydraulic pressure in the wheel cylinders 40 is discharged through the outlet valves 222 is because the pressure in the reservoir 30 is smaller than the pressure in the wheel cylinders 40. The pressure in the reservoir 30 is usually provided at atmospheric pressure. Since the pressure in the wheel cylinders 40 is usually significantly higher than the atmospheric pressure, the hydraulic pressure in the wheel cylinders 40 is quickly discharged to the reservoir 30 when the outlet valves 222 are opened.

Meanwhile, the fourth outlet valve 222d is opened to discharge the hydraulic pressure of the corresponding wheel cylinder 40 and at the same time in a case where the first to third inlet valves 221a to 221c are switched to in the open state, the hydraulic pressure may be supplied to the remaining three wheels FR, RL and RR.

The flow rate discharged from the wheel cylinders 40 increases as the difference between the pressure in the wheel cylinders 40 and the pressure in the first pressure chamber 112 increases. As an example, the greater the volume of the first pressure chamber 112 as the hydraulic piston 114 moves backward, the larger the flow rate may be discharged from the wheel cylinders 40.

As such, the electronic control unit independently controls the respective valves 221a, 221b, 221c, 221d, 222a, 222b, 222c, 222d, 233, 235, 236 and 243, so that the hydraulic pressure may be selectively transmitted to or discharged from the wheel cylinders 40 of the wheels RL, RR, FL and FR according to the required pressure, thereby performing precise pressure control.

Although the hydraulic pressure generating operation when the hydraulic piston 114 advances is exemplified as an example in the first embodiment, the present disclosure is not limited thereto. For example, the operation may be controlled so that the hydraulic pressure and the negative pressure may be generated in the first pressure chamber 112 and the second pressure chamber 113, respectively, even when the hydraulic piston 114 retracts.

Next, a state in which the electronic brake system 1 according to the first embodiment of the present disclosure is operated in an inspection mode will be described.

In a case where the electronic brake system 1 operates abnormally, the respective valves 54, 60, 221a, 221b, 221c, 221d, 222a, 222b, 222c, 222d, 233, 235, 236 and 243 are provided in an initial state of braking which is in a non-operating state, and the first and second cut valves 261 and 262 provided on the first and second backup passages 251 and 252 and the inlet valves 221 provided on an upstream side of the wheel cylinders 40 provided on the respective wheels RR, RL, FR and FL are opened, so that the hydraulic pressure is immediately transmitted to the wheel cylinders 40.

At this time, the simulator valve 54 is provided in the closed state so that the hydraulic pressure transmitted to the wheel cylinders 40 through the first backup passage 251 is prevented from leaking to the reservoir 30 through the simulation apparatus 50. Therefore, when a driver depresses the brake pedal 10, the hydraulic pressure discharged from the master cylinder 20 is transmitted to the wheel cylinders 40 without loss, thereby ensuring stable braking.

However, when a leak occurs in the simulator valve 54, a part of the hydraulic pressure discharged from the master cylinder 20 may be lost to the reservoir 30 through the simulator valve 54. The simulator valve 54 is provided to be closed in an abnormal mode, but in this case, the hydraulic pressure discharged from the master cylinder 20 pushes the reaction force piston 52 of the simulation apparatus 50, so that leakage may occur in the simulator valve 54 by the pressure formed at the rear end of the simulation chamber 51.

In this way, in a case where leakage occurs in the simulator valve 54, the driver does not obtain the intended braking force, thereby causing a problem in braking stability.

The inspection mode is a mode for generating a hydraulic pressure in the hydraulic pressure supply apparatus 100 to inspect whether there is a loss of pressure in order to inspect whether leakage occurs in the simulator valve 54. In addition, the inspection mode may serve to inspect the failure of the second piston 22a of the master cylinder 20, such as stuck.

If the hydraulic pressure discharged from the hydraulic pressure supply apparatus 100 flows into the reservoir 30 and pressure loss occurs, it is difficult to know whether or not leakage has occurred in the simulator valve 54.

Therefore, in the inspection mode, the hydraulic circuit connected to the hydraulic pressure supply apparatus 100 may be constituted as a closed circuit by closing the inspection valve 60. That is, by closing the inspection valve 60, the simulator valve 54 and the outlet valves 222, the flow passages connecting the hydraulic pressure supply apparatus 100 and the reservoir 30 may be blocked to constitute a closed circuit.

The electronic brake system 1 according to the first embodiment of the present disclosure may provide hydraulic pressure only to the first backup passage 251 to which the simulation apparatus 50 is connected among the first and second backup passages 251 and 252 in the inspection mode. Accordingly, in order to prevent the hydraulic pressure discharged from the hydraulic pressure supply apparatus 100 from being transmitted to the master cylinder 20 along the second backup passage 252, the second cut valve 262 may be switched to the closed state in the inspection mode. In addition, by maintaining the fifth control valve 235 which connects the first hydraulic circuit 201 and the second hydraulic circuit 202 in the closed state and closing the sixth control valve 236 which communicates with the fifth hydraulic passage 215 and the second hydraulic passage 212, the hydraulic pressure in the second pressure chamber 113 may be prevented from leaking to the first pressure chamber 112.

In the inspection mode, in the initial state of the valves 54, 60, 221a, 221b, 221c, 221d, 222a, 222b, 222c, 222d, 233, 235, 236 and 243 included in the electronic brake system 1 of the present disclosure, the first to fourth inlet valves 221a to 221d and the second cut valve 262 are switched to the closed state, and the first cut valve 261 and the third control valve 233 are maintained in the open state, so that the hydraulic pressure generated in the hydraulic pressure supply apparatus 100 may be transmitted to the master cylinder 20.

The hydraulic pressure of the hydraulic pressure supply apparatus 100 may be prevented from being transmitted to the first and second hydraulic circuits 201 and 202 by closing the inlet valves 221, the hydraulic pressure of the hydraulic pressure supply apparatus 100 may be prevented from circulating along the first backup passage 251 and the second backup passage 252 by switching the second cut valve 262 to the closed state, and the hydraulic pressure supplied to the master cylinder 20 may be prevented from leaking to the reservoir 30 by switching the inspection valve 60 to the closed state.

In the inspection mode, after generating the hydraulic pressure in the hydraulic pressure supply apparatus 100, the electronic control unit may analyze a signal transmitted from the backup passage pressure sensor PS2 that measures the oil pressure in the master cylinder 20 and sense a state in which leakage occurs in the simulator valve 54. As an example, as a result of the measurement of the backup passage pressure sensor PS2, it may be determined that the simulator valve 54 is not leaking when there is no loss, and it may be determined that there is a leak in the simulator valve 54 when a loss occurs.

The inspection mode may be executed in a preset condition through the electronic control unit during running or stopping.

As described above, since the manual fallback mode relies on the driver's brake pedal operation, the braking performance may be relatively lowered, and the driver may feel a discomfort because the manual fallback mode requires a significant brake pedal force from the driver.

Therefore, the electronic brake system 1 according to the first embodiment of the present disclosure performs a fallback mode (hereinafter, automatic fallback mode) in which the hydraulic pressure is generated by the redundancy control apparatus 70 in the event of a system abnormality so that emergency braking may be performed more effectively. That is, the redundancy control apparatus 70 performs the conventional fallback function instead, so that the emergency braking may be performed quickly and reliably in the event of a system abnormality, and the driver braking convenience may be improved.

Hereinafter, a state in which the electronic brake system 1 according to the first embodiment of the present disclosure is operated in the automatic fallback mode performed by the redundancy control apparatus 70 will be described.

When the electronic brake system 1 does not operate normally, the valves 54, 60, 221a, 221b, 221c, 221d, 222a, 222b, 222c, 222d, 233, 235, 236 and 243 maintain an initial braking state, which is in a non-operating state, and the first and second cut valves 261 and 262 provided in the first and second backup passages 251 and 252 also maintain an initial braking state, which is the non-operating state.

That is, the inlet valve 221 provided on an upstream side of the wheel cylinders 40 provided in each of the wheels RR, RL, FR and FL maintains the open state, and the first and second cut valves 261 and 262 also maintain the open state.

When a system failure is detected, the electronic control unit switches the first isolation valve 71a and the second isolation valve 71b of the redundancy braking unit 70 from the open state to the closed state and generates a rotational force to the motor 74 to drive the pump 73, and switches the first switching valve 75a and the second switching valve 75b from the closed state to the open state.

Therefore, the hydraulic pressure pumped by the pump 73 is transmitted to the wheel cylinders 40 on the front left wheel FL and the wheel cylinders 40 on the front right wheel FR through the connecting flow passage 72, so that emergency braking may be performed. As such, the electronic brake system 1 according to the first embodiment of the present disclosure may transmit hydraulic pressure to at least two wheel cylinders 40 by the redundancy control apparatus 70 even in the abnormal state of the system, so that the emergency braking may be realized more effectively.

According to the embodiment of the present disclosure, the redundancy control apparatus 70 may perform the conventional fallback function instead, thereby more efficiently designing the hydraulic circuit of the system. This reduces the number of valves in the system, simplifying the hydraulic circuit, making the system compact, reducing operating noise, and reducing costs.

Figure 3:
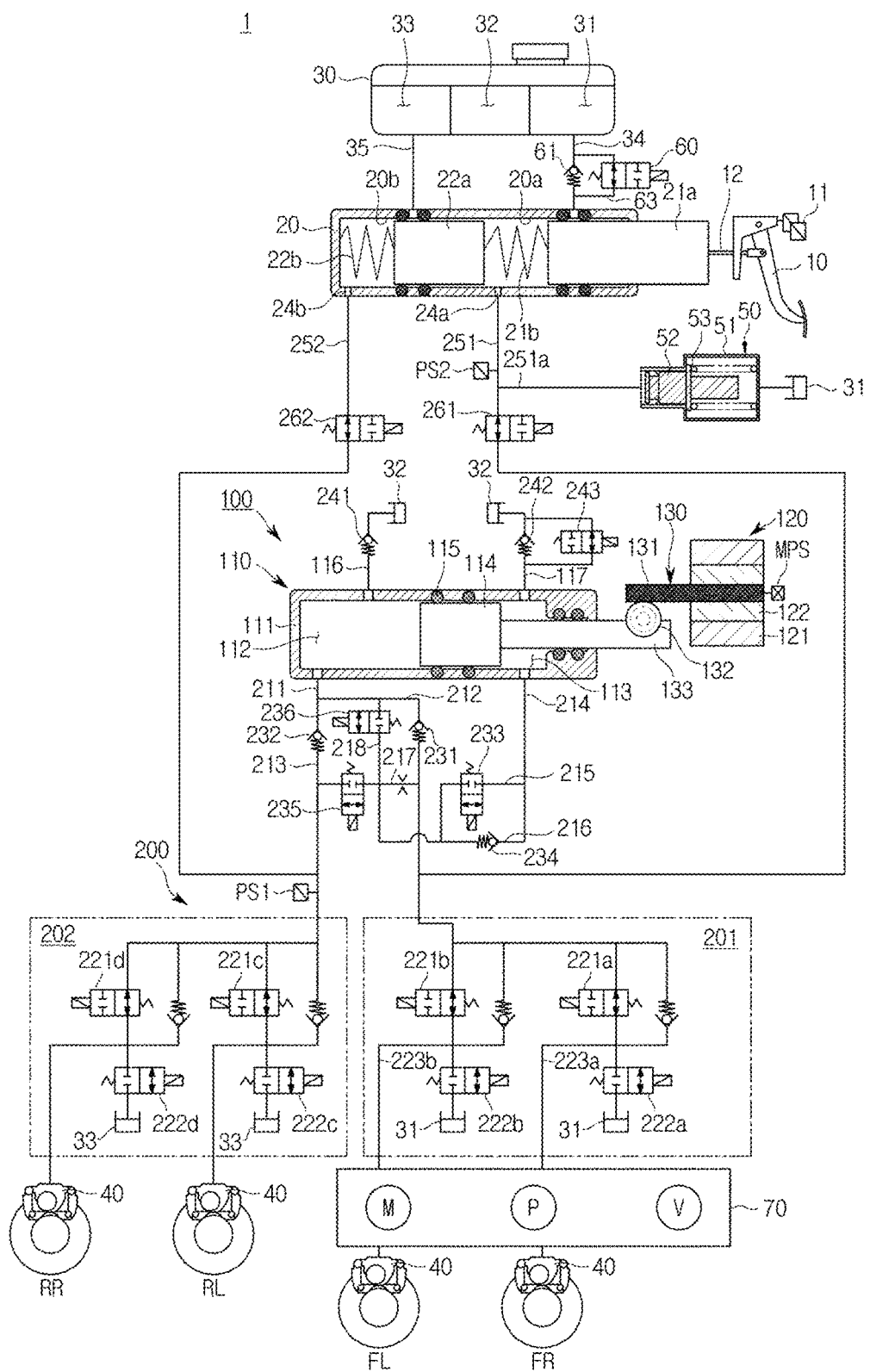
FIG. 3 is a hydraulic circuit diagram showing a non-braking state of an electronic brake system according to a second embodiment of the present disclosure.
Figure 4:
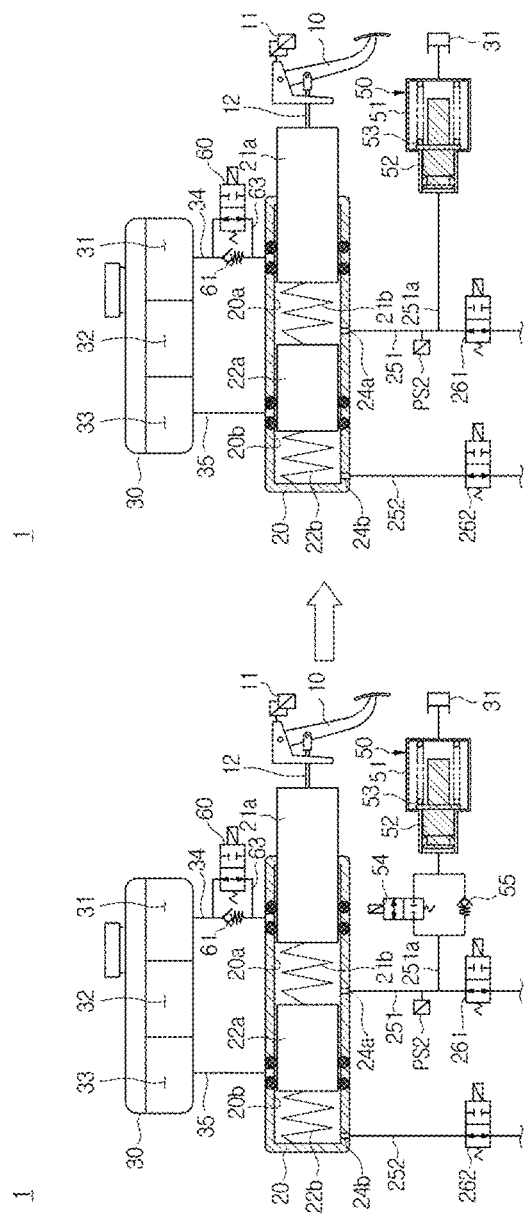
FIG. 4 is a schematic view of a pedal simulator according to the second embodiment of the present disclosure, in which one side pedal simulator is directly connected to a flow passage branched from a first backup passage without a valve intervening therebetween, and the other side of the pedal simulator is directly connected to a reservoir, without a valve intervening therebetween.

FIG. 3 is a hydraulic circuit diagram showing a non-braking state of an electronic brake system according to a second embodiment of the present disclosure. FIG. 4 is a schematic view of a pedal simulator according to the second embodiment of the present disclosure, in which one side pedal simulator is directly connected to a flow passage branched from a first backup passage without a valve intervening therebetween, and the other side of the pedal simulator is directly connected to a reservoir, without a valve intervening therebetween.

Referring to FIGS. 3 and 4, in the electronic brake system according to the second embodiment of the present disclosure, a branch passage 251a provided with the pedal simulator may be directly connected to the first backup passage 251 and the reservoir 30 at any time without an electronic valve intervention.

By performing the fallback function of the redundancy control apparatus 70, the simulator valve 54 provided in the branch passage 251a of the electronic brake system according to the first embodiment of the present disclosure and the simulator check valve 55 connected to the simulator valve 54 in parallel are unnecessary. Therefore, the branch passage 251a may be directly connected to the first backup passage 251 and the reservoir 30 without an electronic valve intervention.

The operation of the pedal simulation apparatus 50 in the electronic brake system according to the second embodiment of the present disclosure will be described. when the driver provides the pedal effort to the brake pedal 10 regardless of whether the system is normal or abnormal, the oil in the simulation chamber 51 is always transmitted to the reservoir 30 as the reaction force piston 52 of the pedal simulator pushes the reaction force spring 53, and the driver is provided with a sense of pedaling in this process.

Figure 5:
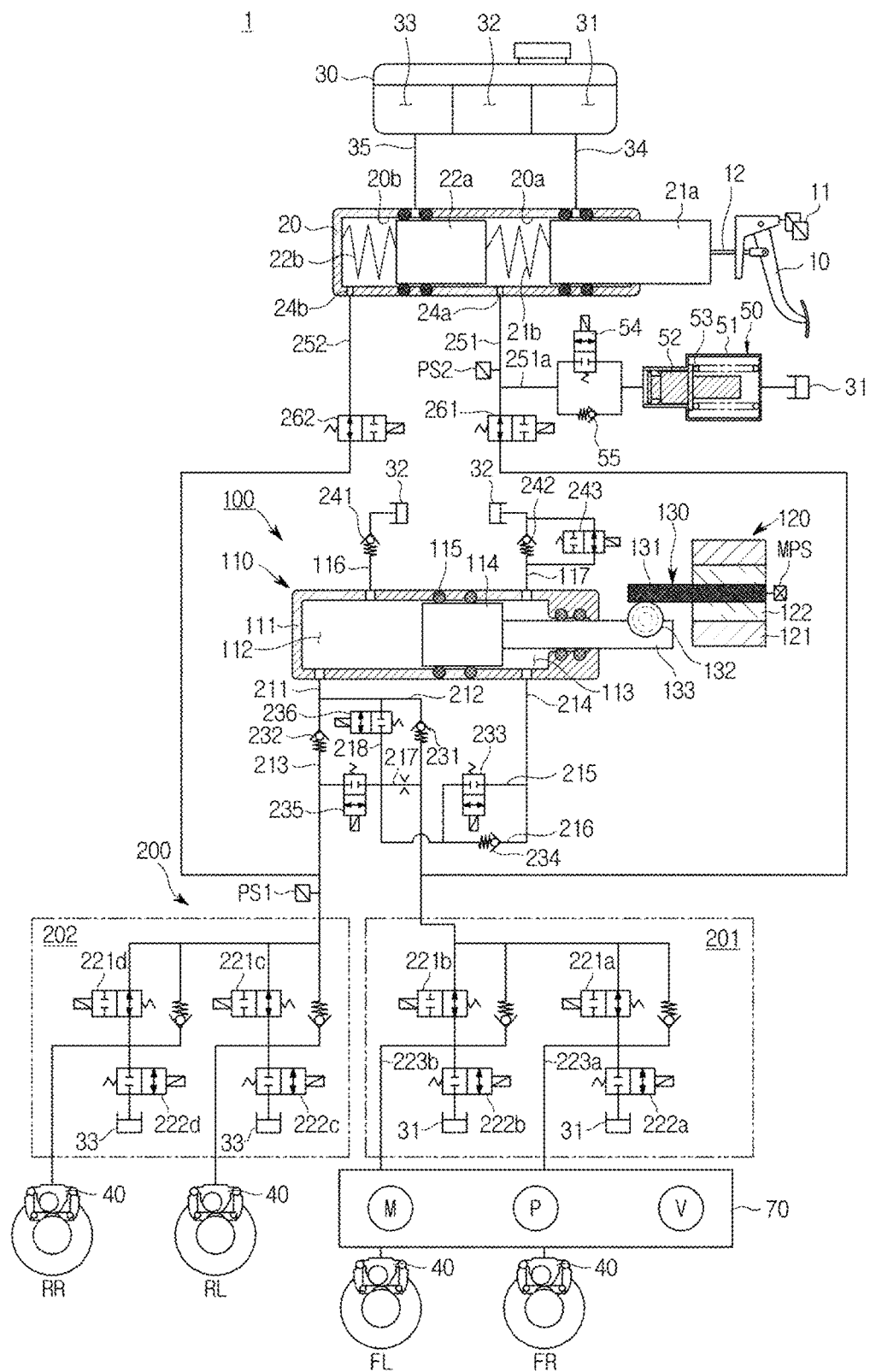
FIG. 5 is a hydraulic circuit diagram showing a non-braking state of an electronic brake system according to a third embodiment of the present disclosure.
Figure 6:
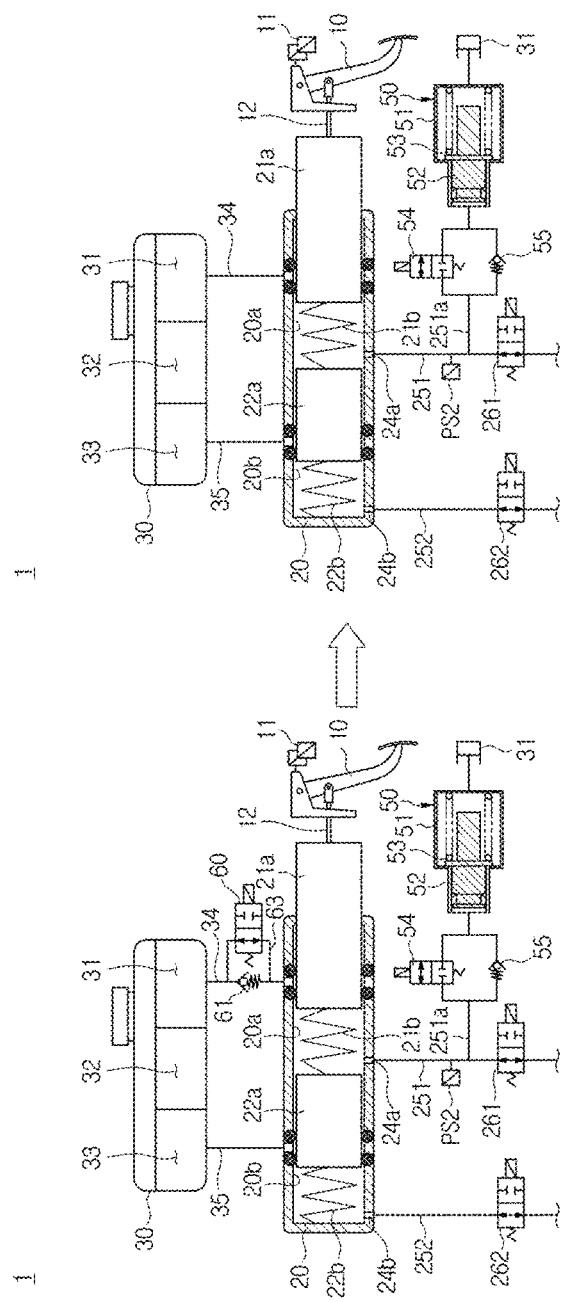
FIG. 6 is a view for explaining that a first master chamber of the master cylinder is directly connected to a first reservoir passage without valve intervention in the electronic brake system according to the third embodiment of the present disclosure.

FIG. 5 is a hydraulic circuit diagram showing a non-braking state of an electronic brake system according to a third embodiment of the present disclosure and FIG. 6 is a view for explaining that a first master chamber of the master cylinder is directly connected to a first reservoir passage without valve intervention in the electronic brake system according to the third embodiment of the present disclosure.

Referring to FIGS. 5 and 6, in the electronic brake system according to the third embodiment of the present disclosure, the first reservoir passage 34 may be directly connected to the reservoir 30 and the master cylinder 20 without an electronic valve intervention.

The redundancy control apparatus 70 performs the fallback function so that the inspection mode performed in the electronic brake system according to the first embodiment of the present disclosure is unnecessary. Therefore, the inspection valve 60, the check valve 61, and the bypass passage 63 provided in the first reservoir flow passage 34 may be eliminated for the inspection mode. That is, it is not necessary to check the leakage of the simulator valve 54 and the stuck failure of the second piston 22a of the master cylinder 20 because the redundancy control apparatus 70 performs the fallback function, so that the first reservoir passage 34 may be directly connected to the reservoir 30 and master cylinder 20 without an electronic valve intervention.

Figure 7:
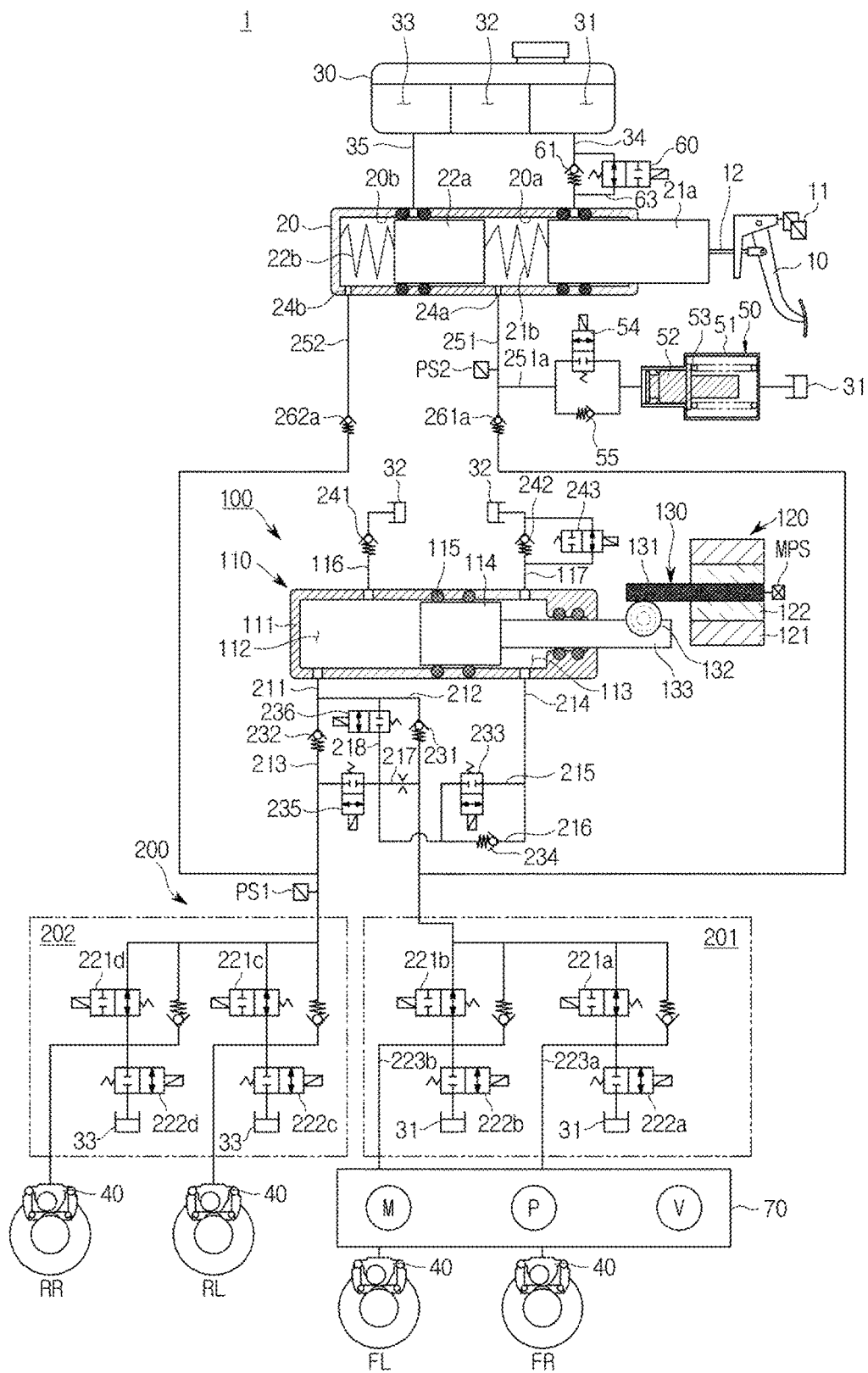
FIG. 7 is a hydraulic circuit diagram showing a non-braking state of an electronic brake system according to a fourth embodiment of the present disclosure.
Figure 8:
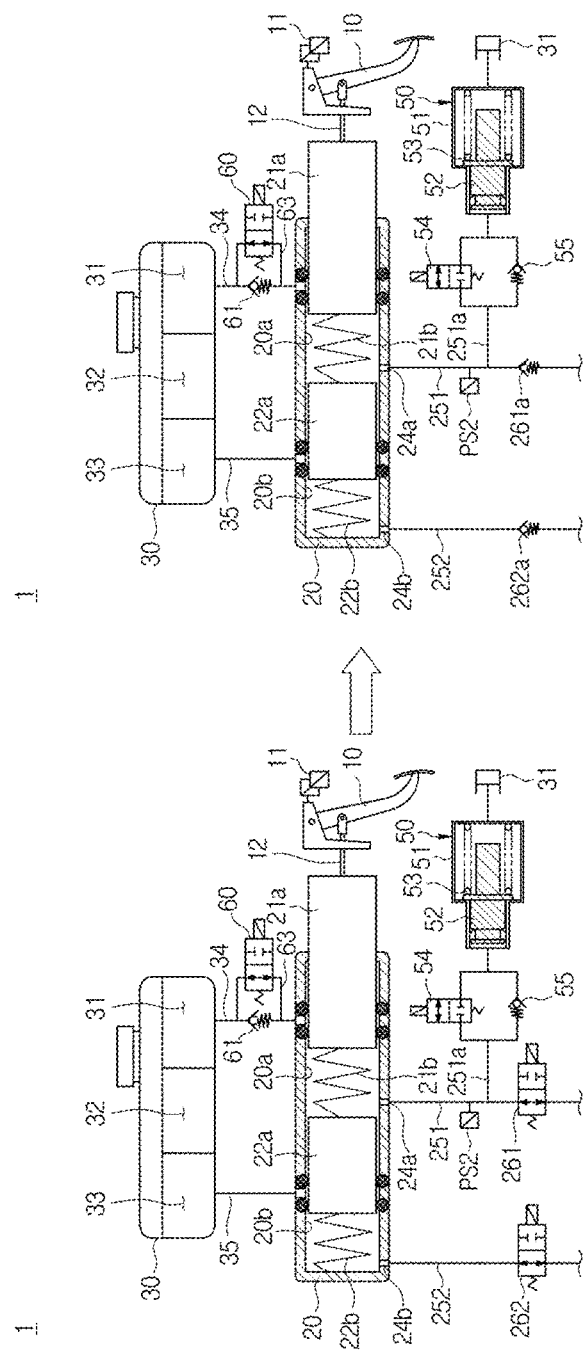
FIG. 8 is a view for explaining that a check valve is connected to a backup passage instead of a solenoid valve in the electronic brake system according to the fourth embodiment of the present disclosure.

FIG. 7 is a hydraulic circuit diagram showing a non-braking state of an electronic brake system according to a fourth embodiment of the present disclosure and FIG. 8 is a view for explaining that a check valve is connected to a backup passage instead of a solenoid valve in the electronic brake system according to the fourth embodiment of the present disclosure.

Referring to FIGS. 7 and 8, in the electronic brake system according to the fourth embodiment of the present disclosure, the first backup passage 251 and second backup passage 252 may be directly connected to the master cylinder 20 and the hydraulic control unit 200 without an electronic valve intervention.

The redundancy control apparatus 70 performs the fallback function so that the first cut valve 261 and the second cut valve 262 in the electronic brake system according to the fourth embodiment of the present disclosure only need to partly separate the master cylinder 20 and the hydraulic pressure supply apparatus 100 from each other. That is, the first cut valve 261 and the second cut valve 262 only need to allow transmitting the hydraulic pressure discharged from the master cylinder 20 to the hydraulic control unit 200 and block the flow of oil flowing into the master cylinder 20 from the hydraulic pressure supply apparatus 100.

Therefore, the first cut valve 261 and the second cut valve 262 may be changed to a first check valve 261a and a second check valve 262a, respectively.

The first check valve 261a and the second check valve 262a may be provided so as to block the flow of oil flowing into the master cylinder 20 from the hydraulic pressure supply apparatus 100 while allowing the flow of oil flowing from the master cylinder 20 to the hydraulic pressure supply apparatus 100.

Figure 9:
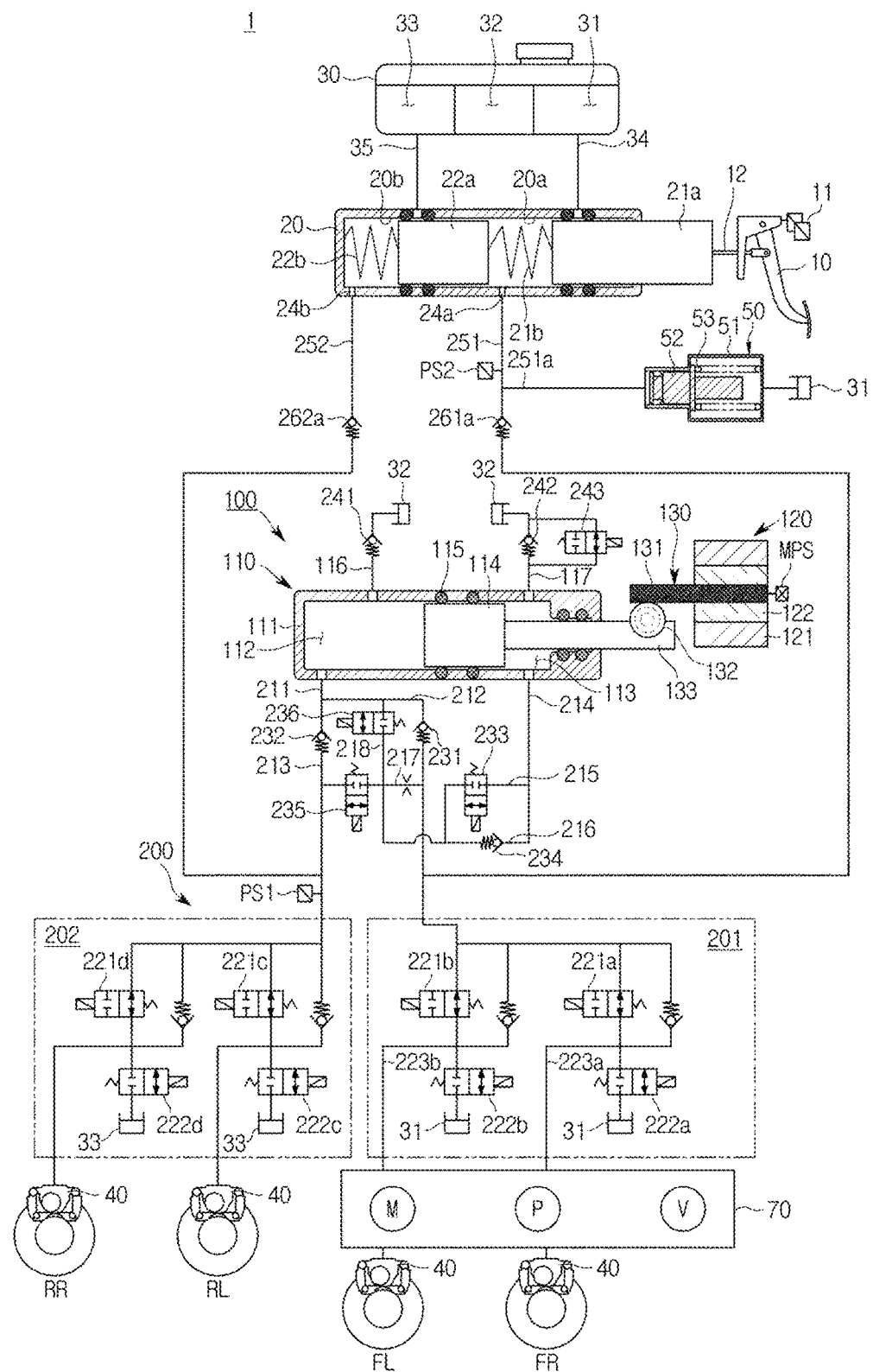
FIG. 9 is a hydraulic circuit diagram showing a non-braking state of an electronic brake system according to a fifth embodiment of the present disclosure.
Figure 10:
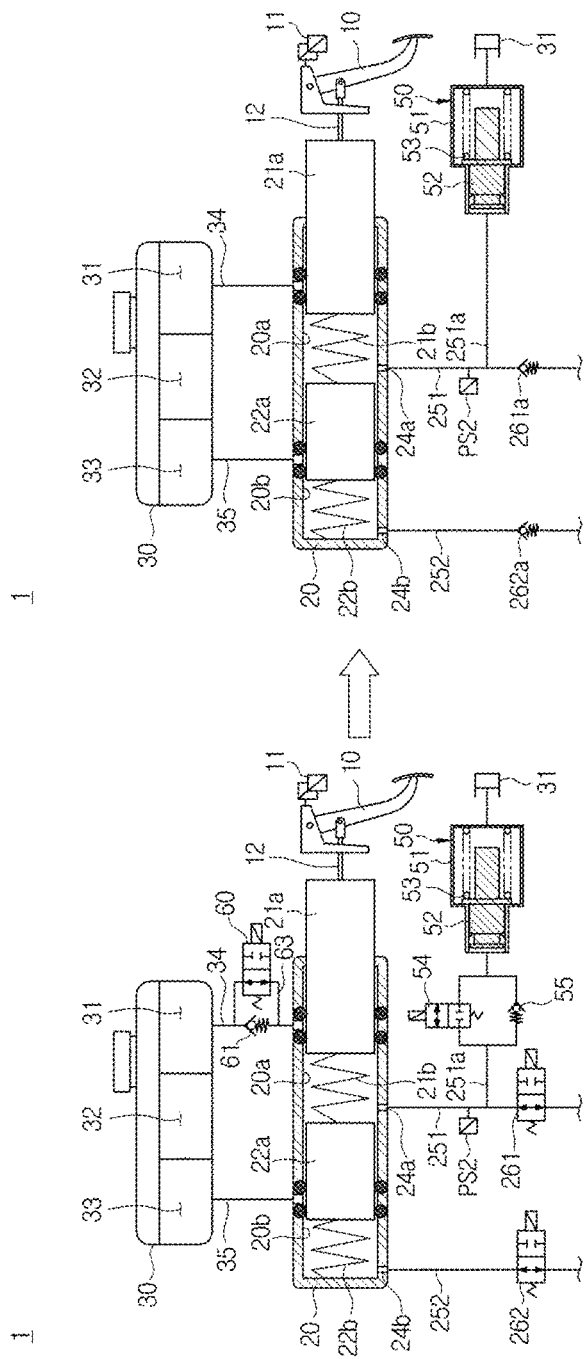
FIG. 10 is a view for explaining that a flow passage configuration connected to a pedal simulator, a first reservoir passage configuration, and a backup passage configuration in the electronic brake system according to the fifth embodiment of the present disclosure.

FIG. 9 is a hydraulic circuit diagram showing a non-braking state of an electronic brake system according to a fifth embodiment of the present disclosure, and FIG. 10 is a view for explaining that a flow passage configuration connected to a pedal simulator, a first reservoir passage configuration, and a backup passage configuration in the electronic brake system according to the fifth embodiment of the present disclosure.

Referring to FIGS. 9 and 10, in the electronic brake system according to the fifth embodiment of the present disclosure, a branch passage 251a provided with a pedal simulator may be directly connected to a first backup passage 251 and a master cylinder 20 at any time without an electronic valve intervention.

Further, a first reservoir passage 34 may be directly connected to a reservoir 30 and a master cylinder 20 without an electronic valve intervention.

Further, a first backup passage 251 and a second backup passage 252 may be directly connected to a master cylinder 20 and a hydraulic control unit 200 without an electronic valve intervention.

As described above, according to the embodiments of the present disclosure, by reducing the number of valves in the system, the hydraulic circuit may be simplified, the system may be configured compact, the operating noise may be reduced, and the cost may be reduced.

In the above described embodiments, the branch passage 251a, the first reservoir passage 34, the first backup passage 251 and the second backup passage 252, independently or all three of them, may be provided in the flow passages without a solenoid valve. However, the present disclosure is not limited to this, and various other combinations are possible.

According to the embodiment of the present disclosure, emergency braking may be performed quickly and reliably in the event of a system abnormality.

According to the embodiment of the present disclosure, by reducing the number of valves in the system, the hydraulic circuit may be simplified, the system may be configured compact, the operating noise may be reduced, and the cost may be reduced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
a reservoir configured to store oil;
a master cylinder having a master piston connected to a brake pedal and a master chamber for discharging oil by a displacement of the master piston;
a hydraulic pressure supply apparatus configured to generate hydraulic pressure in response to an electrical signal output corresponding to a displacement of the brake pedal to supply to wheel cylinders of the respective wheels;
a hydraulic control unit having a first hydraulic circuit for controlling the hydraulic pressure transmitted to the two wheel cylinders and a second hydraulic circuit for controlling the hydraulic pressure transmitted to the other two wheel cylinders, and transmitting the hydraulic pressure discharged from the hydraulic pressure supply apparatus to the wheel cylinders of the respective wheels;
a simulation apparatus configured to provide a reaction force in accordance with a pedal effort of the brake pedal;
a reservoir passage connecting the reservoir and the master chamber;
a backup passage connecting the master chamber to the first hydraulic circuit and the second hydraulic circuit;
a branch passage connecting the master chamber and the simulation apparatus; and
a redundancy control apparatus provided between the hydraulic control unit and the wheel cylinders, the redundancy control apparatus configured to generate hydraulic pressure using a motor and a pump to transmit to at least one of the wheel cylinders,
wherein the redundancy control apparatus comprises:
one or more isolation valves connected between the hydraulic control unit and the at least one of the wheel cylinders, wherein the one or more isolation valves are a normally open valve, and
one or more switching valves connected between a downstream of the pump and the at least one of the wheel cylinders, wherein the one or more switching valves are a normally closed valve.

2. The electronic brake system according to claim 1, wherein the one or more isolation valves are configured to be closed to prevent the hydraulic pressure transmit from the hydraulic control unit to the wheel cylinders in response to a system abnormality,
wherein the redundancy control apparatus comprises:
the pump for receiving and pressurizing oil from the reservoir, and
the motor for driving the pump.

3. The electronic brake system according to claim 2,
wherein the hydraulic control unit includes a first circuit flow passage connected to any one of the wheel cylinders and a second circuit flow passage connected to the other wheel cylinders,
the one or more isolation valves include a first isolation valve provided in the first circuit flow passage and a second isolation valve provided in the second circuit flow passage.

4. The electronic brake system according to claim 3,
the redundancy control apparatus further comprises a connection flow passage connecting a downstream side of the first isolation valve and a downstream side of the second isolation valve.

5. The electronic brake system according to claim 4,
wherein the pump is provided in a pair, and the pair of pumps is provided between the connection flow passage and the reservoir.

6. The electronic brake system according to claim 5,
wherein the one or more switching valves are provided in the connection flow passage, and include a first switching valve for controlling the flow of oil toward the first circuit flow passage and a second switching valve for controlling the flow of oil toward the second circuit flow passage.

7. The electronic brake system according to claim 3,
wherein the hydraulic control unit includes a plurality of inlet valves for controlling the flow of oil supplied to each of the wheel cylinders,
the first circuit flow passage and the second circuit flow passage are connecting between a downstream of the inlet valves and the wheel cylinders, respectively.

8. The electronic brake system according to claim 1,
wherein the redundancy control apparatus operates in a fallback mode.

9. The electronic brake system according to claim 1,
wherein the one or more isolation valves are configured to be closed in response to detection of a system abnormality, and the one or more switching valves are configured to be open in response to the detection of the system abnormality.

10. The electronic brake system according to claim 1,
wherein the pump of the redundancy control apparatus provided between the hydraulic control unit and the at least one of the wheel cylinders is directly connected with the reservoir to directly receive the oil from the reservoir.

11. The electronic brake system according to claim 1,
wherein the reservoir is partitioned into a first reservoir chamber and a second reservoir chamber, the first reservoir chamber of the partitioned reservoir is connected with the master cylinder, and the second reservoir chamber of the partitioned reservoir is connected with the pump of the redundancy control apparatus.

12. An electronic brake system comprising:
a reservoir configured to store oil;
a master cylinder having a master piston connected to a brake pedal and a master chamber for discharging oil by a displacement of the master piston;
a hydraulic pressure supply apparatus configured to generate hydraulic pressure by an electrical signal output corresponding to a displacement of the brake pedal to supply to wheel cylinders of the respective wheels;
a hydraulic control unit having a first hydraulic circuit for controlling the hydraulic pressure transmitted to the two wheel cylinders and a second hydraulic circuit for controlling the hydraulic pressure transmitted to the other two wheel cylinders, and transmitting the hydraulic pressure discharged from the hydraulic pressure supply apparatus to the wheel cylinders of the respective wheels; and
a redundancy control apparatus provided between the hydraulic control unit and the wheel cylinders, the redundancy control apparatus configured to generate hydraulic pressure using a motor and a pump to transmit to at least one of the wheel cylinders,
wherein the redundancy control apparatus comprises:
the pump connected with the reservoir to receive oil from the reservoir, the pump configured to pressurize the oil received from the reservoir,
the motor for driving the pump,
one or more isolation valves connected between the hydraulic control unit and the at least one of the wheel cylinders, the one or more isolation valves configured to be normally open and closed in response to detection of a system abnormality, and
one or more switching valves provided between the pump and the wheel cylinders, the one or more isolation valves configured to be normally closed and open in response to the detection of the system abnormality.

13. The electronic brake system according to claim 12, further comprising:
one or more backup passages directly connecting the master cylinder to the first hydraulic circuit and the second hydraulic circuit without an electrically controlled valve.

14. The electronic brake system according to claim 13,
wherein the one or more backup passages provide with one or more check valves to block the flow of oil flowing into the master cylinder from the hydraulic pressure supply apparatus while allowing the flow of oil flowing from the master cylinder to the first hydraulic circuit and the second hydraulic circuit.

15. The electronic brake system according to claim 14,
the one or more backup passages comprise a first backup passage for connecting the master cylinder and the first hydraulic circuit and a second backup passage for connecting the master cylinder and the second hydraulic circuit.

16. The electronic brake system according to claim 15,
the one or more check valves include a first check valve provided in the first backup passage and a second check valve provided in the second backup passage.

17. The electronic brake system according to claim 13,
wherein the redundancy control apparatus operates in a fallback mode.

18. An electronic brake system comprising:
a reservoir configured to store oil;
a master cylinder having a master piston connected to a brake pedal and a master chamber for discharging oil by a displacement of the master piston;
a hydraulic pressure supply apparatus configured to generate hydraulic pressure in response to an electrical signal output corresponding to a displacement of the brake pedal to supply to wheel cylinders of the respective wheels;
a hydraulic control unit having a first hydraulic circuit for controlling the hydraulic pressure transmitted to the two wheel cylinders and a second hydraulic circuit for controlling the hydraulic pressure transmitted to the other two wheel cylinders, and transmitting the hydraulic pressure discharged from the hydraulic pressure supply apparatus to the wheel cylinders of the respective wheels;

a simulation apparatus configured to provide a reaction force in accordance with a pedal effort of the brake pedal;

a reservoir passage connecting the reservoir and the master chamber;

a backup passage connecting the master chamber to the first hydraulic circuit and the second hydraulic circuit;

a branch passage connecting the master chamber and the simulation apparatus; and a redundancy control apparatus provided between the hydraulic control unit and the wheel cylinders, the redundancy control apparatus configured to generate hydraulic pressure using a motor and a pump to transmit to at least one of the wheel cylinders, wherein the redundancy control apparatus comprises: the pump connected with the reservoir to receive the oil from the reservoir and pressurize the oil received from the reservoir, and connected with the at least one of the wheel cylinders to provide the pressurized oil to the at least one of the wheel cylinders; and one or more switching valves connected between the pump and the at least one of the wheel cylinders.

19. The electronic brake system according to claim 18, wherein the pump of the redundancy control apparatus provided between the hydraulic control unit and the wheel cylinder is directly connected with the reservoir to directly receive the oil from the reservoir.

20. The electronic brake system according to claim 18, wherein the reservoir is partitioned into a first reservoir chamber and a second reservoir chamber, the first reservoir chamber of the partitioned reservoir is connected with the master cylinder, and the second reservoir chamber of the partitioned reservoir is connected with the pump of the redundancy control apparatus.

\* \* \* \* \*